United States Patent
Yamada

(10) Patent No.: US 8,859,968 B2
(45) Date of Patent: Oct. 14, 2014

(54) METHOD FOR MANUFACTURING SENSOR APPARATUS AND SENSOR APPARATUS

(71) Applicant: Seiko Epson Corporation, Tokyo (JP)

(72) Inventor: Kenji Yamada, Nagano (JP)

(73) Assignee: Seiko Epson Corporation, Tokyo (JP)

(*) Notice: Subject to any disclaimer, the term of this patent is extended or adjusted under 35 U.S.C. 154(b) by 120 days.

(21) Appl. No.: 13/687,076

(22) Filed: Nov. 28, 2012

(65) Prior Publication Data
US 2013/0140461 A1   Jun. 6, 2013

(30) Foreign Application Priority Data

Dec. 1, 2011   (JP) ................... 2011-263439
Dec. 1, 2011   (JP) ................... 2011-263440
Dec. 1, 2011   (JP) ................... 2011-263442

(51) Int. Cl.
G01J 5/00   (2006.01)
G01J 5/34   (2006.01)

(52) U.S. Cl.
CPC ........................ *G01J 5/34* (2013.01)
USPC ............................... 250/338.3

(58) Field of Classification Search
CPC ........................................... G01J 5/34
USPC ..................................... 250/338.3
See application file for complete search history.

(56) References Cited

U.S. PATENT DOCUMENTS 7,727,322 B2   6/2010 Noguchi
2011/0180711 A1   7/2011 Tsuchiya

FOREIGN PATENT DOCUMENTS

JP   2006-083040 A   3/2006
JP   2011-153851 A   8/2011

*Primary Examiner* — David Porta
*Assistant Examiner* — Hugh H Maupin
(74) *Attorney, Agent, or Firm* — Global IP Counselors, LLP

(57) ABSTRACT

A method for manufacturing a sensor apparatus including forming a first conductive section in the first region, forming a pyroelectric body above the first conductive section, forming a second conductive body above the pyroelectric body, forming a first insulating film both above the second conductive body and in the second region, forming a first opening section with the second conductive section as the bottom surface in the first region by removing a portion of the first insulating film and for forming a second opening section in the second region, filling a third conductive section into both the first opening section and the second opening section, forming a second insulating film which covers the pyroelectric body in the first region and covers the third conductive section in the second region, and forming a third opening section with the third conductive section as the bottom surface by removing a portion of the second insulating film.

16 Claims, 17 Drawing Sheets

METHOD FOR MANUFACTURING SENSOR APPARATUS AND SENSOR APPARATUS

CROSS-REFERENCE TO RELATED APPLICATIONS

This application claims priority to Japanese Patent Application No. 2011-263439 filed on Dec. 1, 2011, Japanese Patent Application No. 2011-263440 filed on Dec. 1, 2011, and Japanese Patent Application No. 2011-263442 filed on Dec. 1, 2011. The entire disclosure of Japanese Patent Application Nos. 2011-263439, 2011-263440 and 2011-263442 is hereby incorporated herein by reference.

BACKGROUND

The present invention relates to a method for manufacturing a sensor apparatus and a sensor apparatus.

As the related art, for example, there is the technology disclosed in Japanese Unexamined Patent Application Publication No. 2011-153851. That is, a pyroelectric light detecting element is disclosed in Japanese Unexamined Patent Application Publication No. 2011-153851 with a structure which has a pyroelectric film (strong dielectric film), a lower electrode which is connected to the lower side of the pyroelectric body, and an upper electrode which is connected to the upper side of the pyroelectric body.

The pyroelectric light detecting element captures the polarization state due to the temperature of the pyroelectric body using a pyroelectric current. That is, the temperature of the pyroelectric body changes when light (for example, infrared or the like) is irradiated onto the pyroelectric light detecting element. A change is generated in the surface charge amount of the pyroelectric body by a change being generated in the amount of spontaneous polarization when there is a change in temperature and the surface charge is neutralized when there is no change in temperature. A pyroelectric current flows between the upper electrode and the lower electrode in accompaniment with the change in the surface charge amount of the pyroelectric body. The pyroelectric light detecting element detects the amount of light such as infrared which has been irradiated by detecting the pyroelectric current.

However, a bonding pad is normally formed in a substrate where the pyroelectric light detecting element is formed so as to secure an electrical connection with the outside. Here, the bonding pad with a structure which is appropriate to be formed on the same substrate as the pyroelectric light detecting element (referred to below as a pyroelectric sensor) and the forming method thereof is not specifically disclosed in Japanese Unexamined Patent Application Publication No. 2011-153851.

SUMMARY

A first embodiment of the invention relates to a method for manufacturing a sensor apparatus which has a pyroelectric sensor in a first region above a substrate and a bonding pad in a second region which is different to the first region above the substrate, where the method includes a process for forming a first conductive section in the first region, a process for forming a pyroelectric body above the first conductive section, a process for forming a second conductive body above the pyroelectric body, a process for forming a first insulating film both above the second conductive body and in the second region, a process for forming a first opening section with the second conductive section as the bottom surface in the first region by removing a portion of the first insulating film and for forming a second opening section in the second region, a process for filling a third conductive section into both the first opening section and the second opening section, a process of forming a second insulating film which covers the pyroelectric body in the first region and covers the third conductive section in the second region, and a process for forming a third opening section with the third conductive section as the bottom surface by removing a portion of the second insulating film.

Another embodiment of the invention is a sensor apparatus which has a pyroelectric sensor in a first region above a substrate and has a bonding pad in a second region which is different to the first region above the substrate, where the sensor includes a first conductive section in the first region, a pyroelectric body which is formed above the first conductive section, a second conductive body which is formed above the pyroelectric body, a first insulating film which is formed above the substrate so as to cover the second conductive section, has a first opening section with the second conductive section as the bottom surface, and has a second opening section in the second region, a third conductive section which is filled into both the first opening section and the second opening section, and a second insulating film which covers the pyroelectric body in the first region, covers the third conductive section in the second region, and has a third opening section with the third conductive section in the second region as the bottom surface.

BRIEF DESCRIPTION OF THE DRAWINGS

Referring now to the attached drawings which form a part of this original disclosure.

DETAILED DESCRIPTION OF EXEMPLARY EMBODIMENTS

Below, embodiments of the invention will be described while referencing the diagrams. Here, in each of the diagrams which are described below, the same reference numbers are given to the parts which have the same configuration and overlapping description is omitted.

1. First Embodiment 1.1 Configuration

Figure 1:
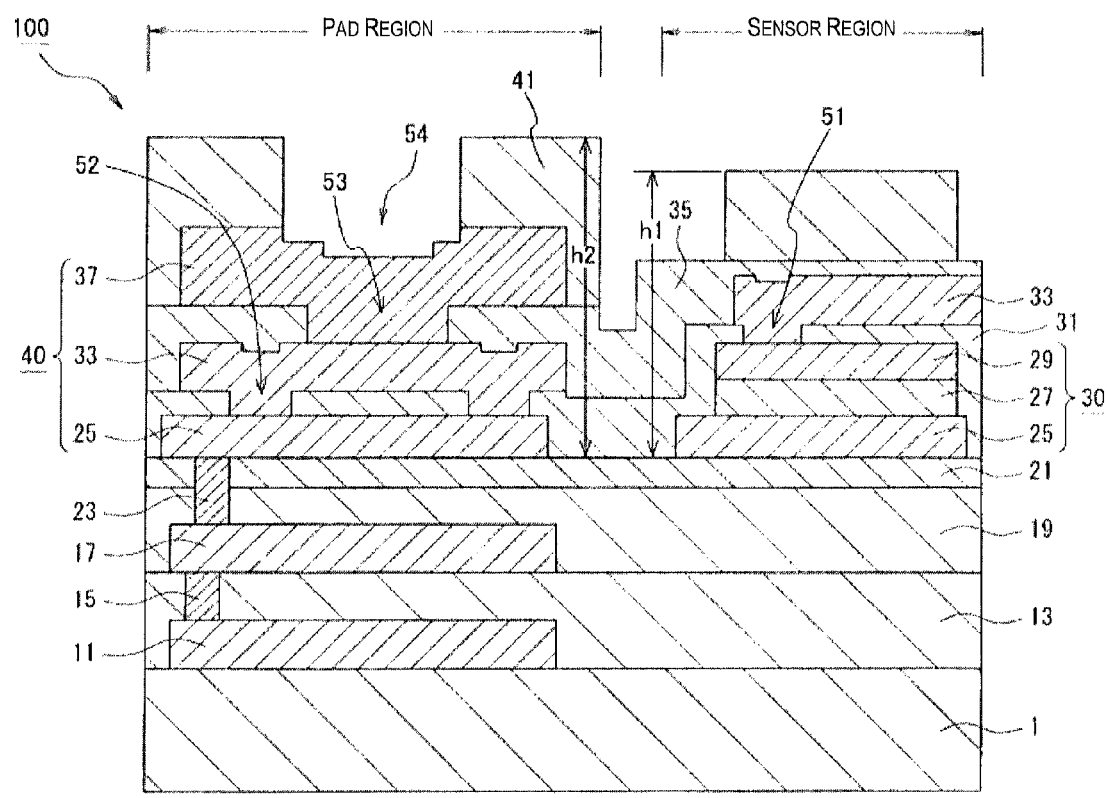
FIG. 1 is a cross sectional diagram illustrating a configuration example of an IR sensor apparatus according to a first embodiment of the invention.

FIG. 1 is a cross sectional diagram illustrating a configuration example of a pyroelectric infrared sensor apparatus (referred to below simply as an IR sensor apparatus) 100 according to a first embodiment of the invention. The IR sensor apparatus 100 is an apparatus which uses a pyroelectric effect and which detects light such as infrared by measuring a change in the polarization state of a pyroelectric body using a voltage or pyroelectric current. The pyroelectric effect is a phenomenon where the polarization state of a pyroelectric body changes due to a change in temperature.

As shown in FIG. 1, the IR sensor apparatus 100 is provided with a silicon substrate 1, a first wiring layer 11, a first interlayer insulating film 13, a second wiring layer 17, a second interlayer insulating film 19, a support layer (that is, a membrane) 21, a first plug electrode 15, and a second plug electrode 23.

The first wiring layer 11 is provided via an insulating film (not shown) above the silicon substrate 1. The first interlayer insulating film 13 covers the first wiring layer 11 by being formed above the silicon substrate 1. The second wiring layer 17 is provided above the first interlayer insulating film 13. The second interlayer insulating film 19 covers the second wiring layer 17 by being formed above the first interlayer insulating film 13. The support layer 21 is provided above the second interlayer insulating film 19. The first plug electrode 15 electrically connects between the first wiring layer 11 and the second wiring layer 17 by penetrating through the first interlayer insulating film 13. The second plug electrode 23 extracts the second wiring layer 17 above the support layer 21 by penetrating through the second interlayer insulating film 19.

The silicon substrate 1 is, for example, a bulk single crystal silicon substrate. Although not shown, for example, various types of elements such as a MOS transistor, a bipolar transistor, a capacitor, and a diffusion resistance on the silicon substrate 1 and the various types of elements are covered by an insulating film which is not shown. Here, the silicon substrate 1 can, for example, have a configuration where a silicon layer of single crystals is epitaxially grown above bulk single crystal silicon. In this case, the various types of elements described above are formed on the silicon layer of single crystals (that is, an epitaxial layer) which are formed due to the epitaxial growth.

The first wiring layer 11 and the second wiring layer 17 are, for example, wirings which are electrically connected to the various types of elements described above. The material of the first wiring layer 11 and the second wiring layer 17 is, for example, titanium nitride (TiN). The interlayer insulating film 13 and the second interlayer insulating film 19 are, for example, a silicon dioxide film ($SiO_2$), a silicon nitride film ($Si_3N_4$), or a laminate film which is a lamination thereof. The material of the first plug electrode 15 and the second plug electrode 23 is, for example, tungsten (W).

In addition, as shown in FIG. 1, the IR sensor apparatus 100 is further provided with a pyroelectric sensor 30, a bonding pad 40, a first insulating film 31, a second insulating film 35, a third insulating film 41, and a third wiring layer 33. The pyroelectric sensor 30 is provided in, for example, a sensor region (that is, a first region) above the silicon substrate 1. The bonding pad 40 is provided in a pad region (that is, a second region) in a position which is above the silicon substrate 1 and is different to the sensor region.

The pyroelectric sensor 30 has a lower electrode 25 which is formed above the support layer 21, a pyroelectric body 27 which is formed above the lower electrode 25, and an upper electrode 29 which is formed above the pyroelectric body 27. Each of the materials of the lower electrode 25 and the upper electrode 29 has conductivity. To give examples, the lower electrode 25 is a laminate film where iridium (Ir), iridium oxide (IrOX), and platinum (Pt) are laminated from below in this order. The upper electrode 29 is a laminate film where platinum, iridium oxide, and iridium are laminated from below in this order. The material of the pyroelectric body 27 is, for example, PZT (lead zirconate titanate) and PZTN where niobium (Nb) has been added to PZT.

In addition, the pyroelectric sensor 30 is covered by the first insulating film 31. The first insulating film 31 is, for example, a silicon oxide film. Furthermore, in the sensor region, a first opening section 51 (refer to FIG. 3C) is provided in the first insulating film 31 to penetrate through so that the upper electrode 29 is the bottom surface. Then, a portion of the third wiring layer 33 in the sensor region is filled into the first opening section 51. Due to this, the third wiring layer 33 in the sensor region is electrically connected to the upper electrode 29. The material of the third wiring layer 33 is, for example, titanium nitride.

Here, the support layer 21 is, for example, a silicon oxide film, a silicon nitride film, or a laminate film which is a lamination thereof. A hollow section which is not shown is formed directly below the support layer 21 in the sensor region, for example, in the front side of the paper or the rear side of the paper of FIG. 1. The hollow section is provided for providing heat insulation between the pyroelectric sensor 30 and the silicon substrate 1. The pyroelectric sensor 30 is supported above the hollow section by the support layer 21.

The second insulating film 35 is provided above the third wiring layer 33. The third insulating film 41 is provided above the second insulating film 35. The second insulating film 35 is, for example, a silicon nitride film and the third insulating film 41 is, for example, a silicon oxide film. In the sensor region, the third insulating film 41 functions as, for example, a film which absorbs light such as infrared and converts the light to heat.

On the other hand, the bonding pad 40 has the lower electrode 25 which is formed above the support layer 21, the third wiring layer 33 which is formed above the lower electrode 25, and a pad electrode layer 37 which is formed above the third wiring layer 33. The electrode layer 37 is, for example, a laminate film where titanium nitride (TiN) and an aluminum (Al) alloy are laminated from below in this order. As the aluminum alloy, for example, AlCu where a small amount of copper (Cu) is added to aluminum and the like can be exemplified.

In addition, the first insulating film 31 is disposed in the pad region between the lower electrode 25 and the third wiring layer 33. Then, a second opening section 52 (refer to FIG. 3C) is provided in the first insulating film 31 to penetrate through so that the lower electrode 25 is the bottom surface. Then, a portion of the third wiring layer 33 in the pad region is filled into the second opening section 52. Due to this, the third wiring layer 33 in the pad region is electrically connected to the lower electrode 25.

In addition, the second insulating film 35 is disposed in the pad region between the third wiring layer 33 and the electrode layer 37, and a third opening section 53 (refer to FIG. 4C) is provided in the second insulating film 35 to penetrate through so that the lower electrode 25 is the bottom surface. Then, a portion of the electrode layer 37 is filled into the third opening section 53. Due to this, the pad electrode layer 37 is electrically connected to the third wiring layer 33 in the pad region.

Furthermore, the third insulating film 41 is provided above the bonding pad 40. The fourth opening section 54 is provided in the third insulating film 41 to penetrate through so that a central portion of the bonding pad 40 is the bottom surface. Although not shown, a wire such as a gold wire is bonded on the surface of the bonding pad 40 which is exposed by the bottom surface of the fourth opening section 54. Then, the IR sensor apparatus 100 is, for example, electrically connected to an external terminal via the gold wire.

1.2 Manufacturing Method

Next, a method for manufacturing the IR sensor apparatus 100 will be described. FIG. 2A to FIG. 5B are cross sectional diagrams illustrating a method for manufacturing the IR sensor apparatus 100 according to the first embodiment of the invention.

Figure 2A:
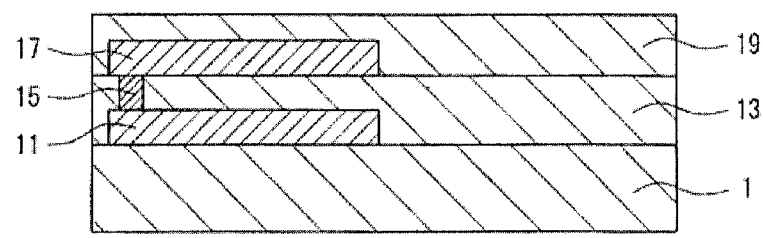
FIGS. 2A to 2C are cross sectional diagrams illustrating a method for manufacturing the IR sensor apparatus of the first embodiment.

First, to begin with, as shown in FIG. 2A, the silicon substrate 1 is prepared. As described above, for example, the first wiring layer 11, the first interlayer insulating film 13, the first plug electrode 15, the second wiring layer 17, and the second interlayer insulating film 19 are formed on one surface side of the silicon substrate 1.

Figure 2B:
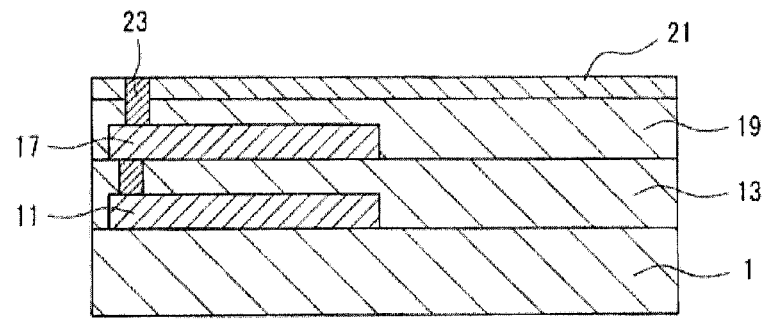

Next, as shown in FIG. 2B, the support layer 21 is formed above the second interlayer insulating film 19. The forming of the support layer 21 is performed using, for example, a CVD (chemical vapor deposition) method. Next, the support layer 21 and the second interlayer insulating film 19 are partially removed using a photolithography technique and an etching technique. That is, patterning is carried out. Due to this, an opening section (that is, an opening section which exposes the second wiring layer 17) is formed in the support layer 21 and the second interlayer insulating film 19 in the pad region with the second wiring layer 17 as the bottom surface. Then, the second plug electrode 23 is formed in the opening section. The method for forming the second plug electrode 23 is, for example, as below. That is, a tungsten film is formed above the support layer 21 so as to fill in the opening section described above. The forming of the tungsten film is performed using, for example, a sputtering method (that is, sputtering). Next, the tungsten film is removed from a region other than the inner side of the opening section (that is, above the support layer 21) by polishing the tungsten film and leaving the tungsten film only in the opening section. The polishing of the tungsten film is performed using, for example, CMP (chemical mechanical polishing). Due to this, the second plug electrode 23 is formed to be electrically connected to the second wiring layer 17 by being filled into the opening section described above.

Figure 2C:
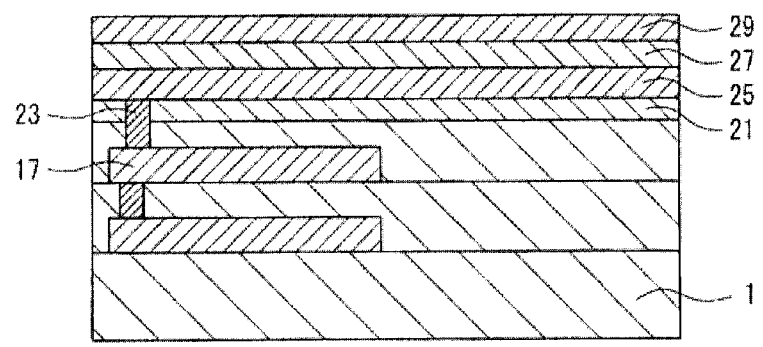

Next, as shown in FIG. 2C, the lower electrode 25, the pyroelectric body 27, and the upper electrode 29 are sequentially laminated above the support layer 21 after the second plug electrode 23 has been formed. The forming of the lower electrode 25 and the upper electrode 29 are each performed using, for example, a sputtering method. In addition, the forming of the pyroelectric body 27 is performed using, for example, a sol gel method, a sputtering method, or a MOCVD (metal organic CVD) method.

Next, the upper electrode 29, the pyroelectric body 27, and the lower electrode 25 are patterned using a photolithography method or an etching method. In the patterning process, first, to begin with, the upper electrode 29 and the pyroelectric body 27 are patterned, and next, the lower electrode 25, which is exposed from below the upper electrode 29 and the pyroelectric body 27, is patterned. Although not shown, when patterning the upper electrode 29 and the pyroelectric body 27, a first resist pattern, which covers the sensor region and has a shape where the pad region is exposed (opened), is used as a mask. Due to this, the pyroelectric body 27 is exposed by removing the upper electrode 29 in the pad region and the lower electrode 25 is exposed in the pad region by removing the pyroelectric body 27 which has been exposed. In addition, when patterning the lower electrode 25, a second resist pattern, which covers both the sensor region and the pad region and has a shape where between both of the regions are exposed, is used as a mask.

Figure 3A:
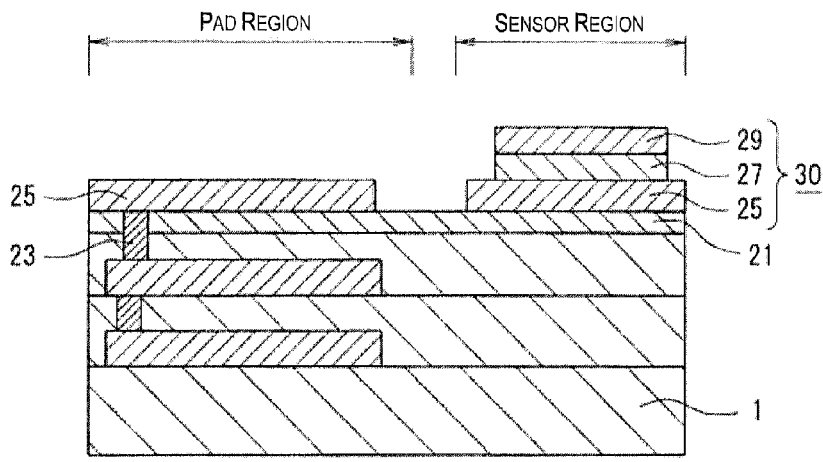
FIGS. 3A to 3C are cross sectional diagrams illustrating a method for manufacturing the IR sensor apparatus of the first embodiment.

As above, as shown in FIG. 3A, along with the forming of the pyroelectric sensor 30 which has the upper electrode 29, the pyroelectric body 27, and the lower electrode 25 in the sensor region, there is a formation where only the lower electrode 25 remains in the pad region due to the upper electrode 29 and the pyroelectric body 27 being removed. The lower electrode 25 which remains in the pad region covers the second plug electrode 23 and is in a state of being electrically connected to the second plug electrode 23.

Figure 3B:
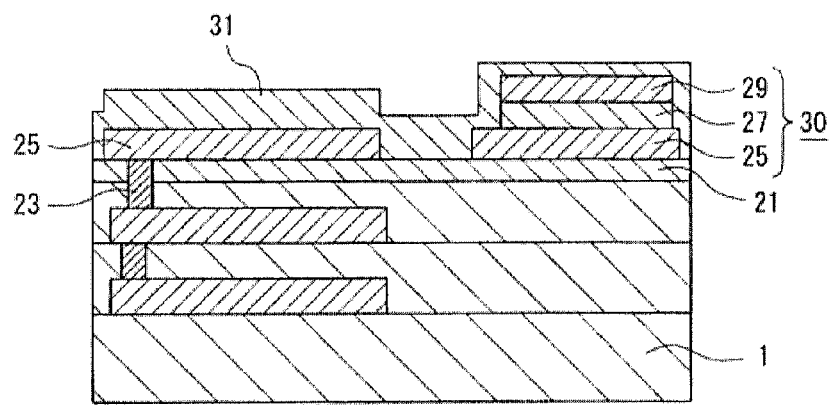

Next, as shown in FIG. 3B, the first insulating film 31 is formed above the silicon substrate 1. The forming of the first insulating film 31 is performed using, for example, a CVD method. Between the pyroelectric sensor 30 in the sensor region and the lower electrode 25 in the pad region is insulated using the first insulating film 31. Then, the first insulating film 31 is patterned using a photolithography technique and an etching technique.

Figure 3C:
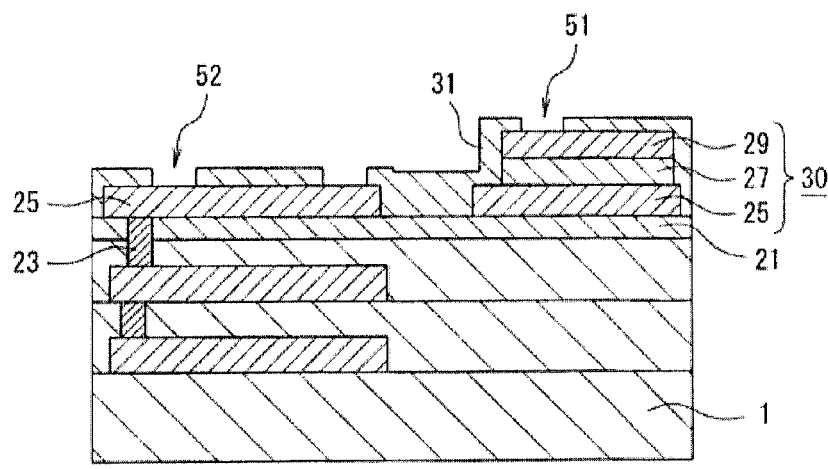

Due to this, as shown in FIG. 3C, along with the forming of the first opening section 51 with the upper electrode 29 as the bottom surface in the first insulating film 31 in the sensor region, the second opening section 52 with the lower electrode 25 as the bottom surface is formed in the first insulating film 31 in the pad region.

Figure 4A:
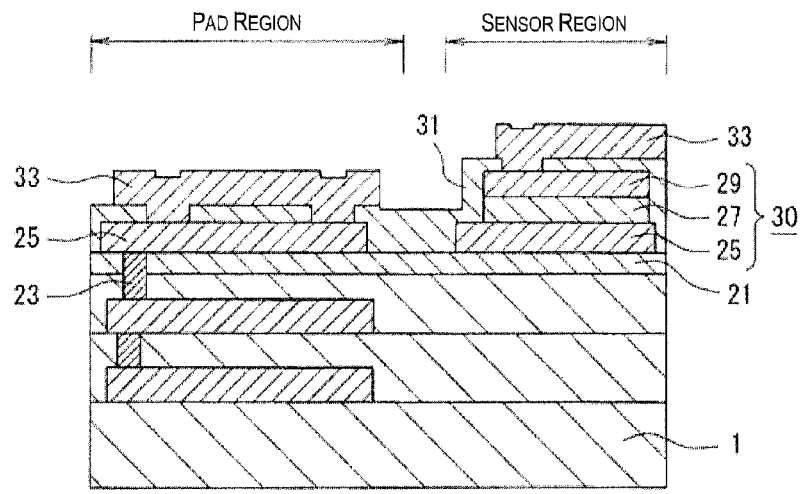
FIGS. 4A to 4C are cross sectional diagrams illustrating a method for manufacturing the IR sensor apparatus of the first embodiment.

Next, for example, a conductive film such as titanium nitride is formed to fill in the first opening section 51 and the second opening section 52. The forming of the conductive film is performed using, for example, a sputtering method. Then, the conductive film is patterned using a photolithography technique and an etching technique. Due to this, as shown in FIG. 4A, the third wiring layer 33, which separates the sensor region and the pad region from each other, is formed.

Figure 4B:
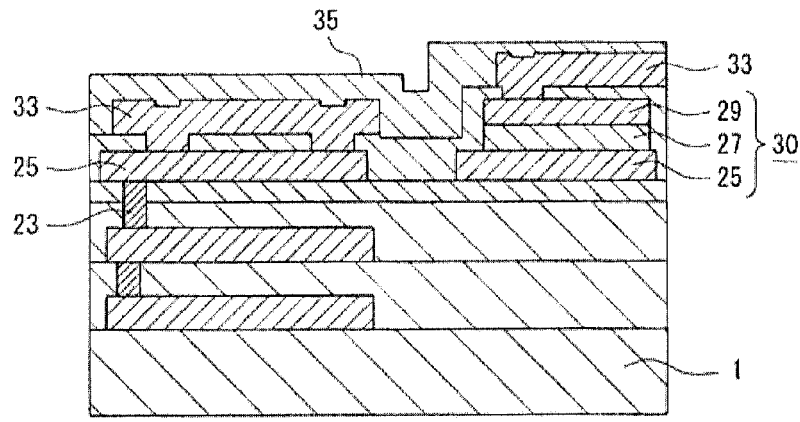

Next, as shown in FIG. 4B, the second insulating film 35 is formed above the silicon substrate 1. The forming of the second insulating film 35 is performed using, for example, a CVD method. The third wiring layer 33 is covered by the second insulating film 35. Then, the second insulating film 35 is patterned using a photolithography technique and an etching technique.

Figure 4C:
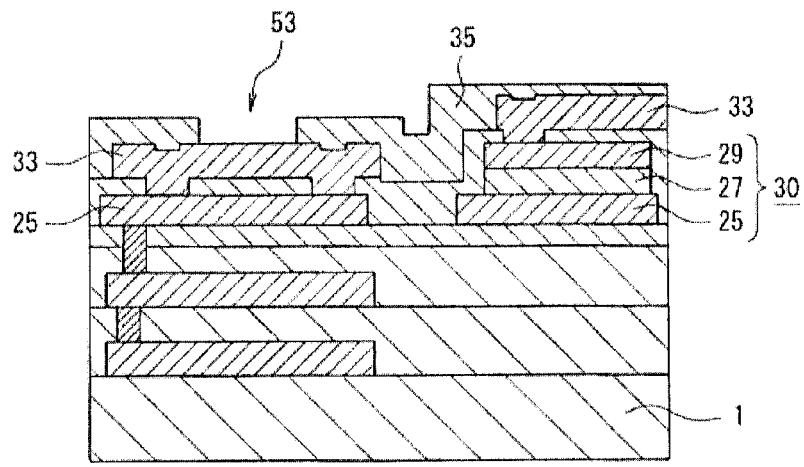
Figure 5A:
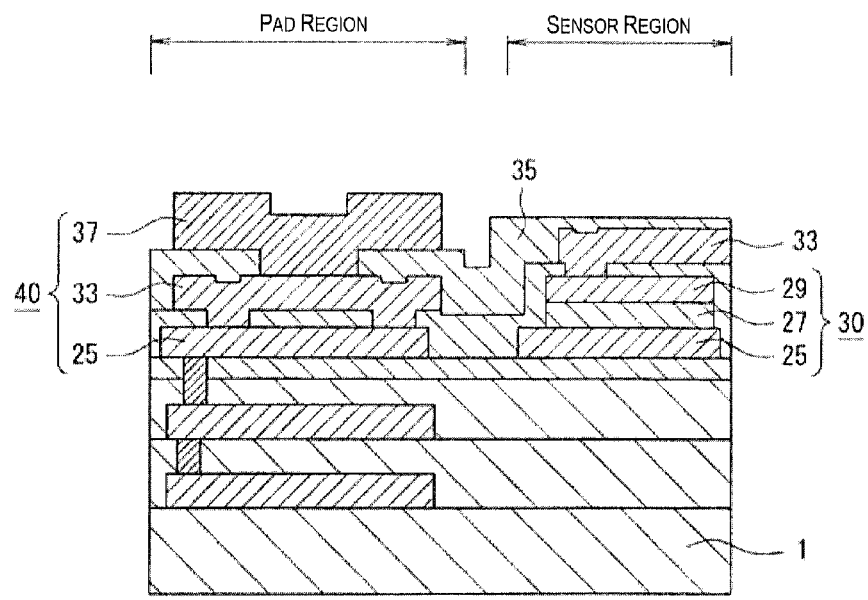
FIGS. 5A and 5B are cross sectional diagrams illustrating a method for manufacturing the IR sensor apparatus of the first embodiment.

Due to this, as shown in FIG. 4C, the third opening section 53 with the third wiring layer 33 as the bottom surface is formed in the second insulating film 35 in the pad region. Next, for example, a conductive film such as AlCu/TiN is formed to fill in the third opening section 53. The forming of the conductive film is performed using, for example, a sputtering method. Then, the conductive film is patterned using a photolithography technique and an etching technique. Due to this, as shown in FIG. 5A, the electrode layer 37 is formed in the pad region.

Figure 5B:
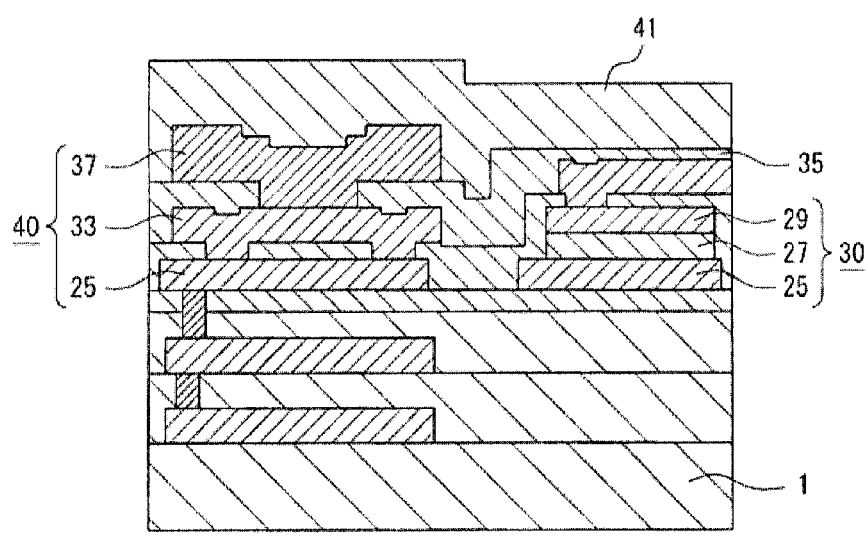

Next, as shown in FIG. 5B, the third insulating film 41 is formed above the silicon substrate 1. As described above, the third insulating film 41 is, for example, a film for absorbing light such as infrared and converting the light to heat. The forming of the third insulating film 41 is performed using, for example, a CVD method. Both the pyroelectric sensor 30 and the bonding pad 40 are covered by the third insulating film 41. Then, the third insulating film 41 is patterned using a photolithography technique and an etching technique.

Due to this, the fourth opening section 54 (refer to FIG. 1) is formed with the bonding pad 40 as the bottom surface in the third insulating film 41 in the pad region. In addition, a hollow section is formed by etching and removing a sacrificial layer which is not shown below the support layer 21 before or after the process for the forming of the fourth opening section 54. The hollow section is a hollow section for providing heat insulation between the pyroelectric sensor 30 and the silicon substrate 1 as described above. Through the processes above, the IR sensor apparatus 100 which is shown in FIG. 1 is completed.

According to the first embodiment above, it is possible to form the lower electrode 25 which configures the pyroelectric sensor 30 and the lower electrode 25 which configures the bonding pad 40 at the same time. In addition, it is possible to form the first opening section 51, which is for electrically connecting the upper electrode 29 and the third wiring layer 33 in the pyroelectric sensor 30, and the second opening section 52, which is for electrically connecting the lower electrode 25 and the third wiring layer 33 in the bonding pad 40, at the same time. Furthermore, it is possible to form the third wiring layer 33, which is electrically connected to the upper electrode 29 in the pyroelectric sensor 30, and the third wiring layer 33, which configures the bonding pad 40, at the same time. In addition, it is possible to form the second insulating film 35, which functions as a light absorption film by covering the pyroelectric sensor 30, and the second insulating film 35, which functions as a protective film by covering a portion of the bonding pad 40, at the same time. In the same manner, it is possible to form the third insulating film 41, which functions as a light absorption film by covering the pyroelectric sensor 30, and the third insulating film 41, which functions as a protective film by covering a portion of the bonding pad 40, at the same time.

In this manner, it is possible to form the bonding pad 40 by using the processes for forming the pyroelectric sensor 30, the wiring layers which are connected to the pyroelectric sensor 30, and the like. Accordingly, it is possible to efficiently form the bonding pad 40 while suppressing an increase in the number of processes.

In addition, according to the first embodiment, it is possible to bond an end of a conductive wire to the bonding pad 40 with high adhesiveness. For example, the electrode layer 37 which is formed from AlCu/TiN exists between the third wiring layer 33 and the conductive wire in the IR sensor apparatus 100. Accordingly, since the third wiring layer 33 is titanium nitride, and titanium nitride (that is, the third wiring layer 33) and gold (that is, the conductive wire) are not in direct contact even in a case where the conductive wire is a gold wire, it is possible to increase the adhesiveness of the bonding pad 40 and the conductive wire.

2. Second Embodiment

In the first embodiment described above, there is a configuration where the lower electrode 25 remains in the pad region as shown in FIG. 1. That is, the pad electrode layer 37 is electrically connected to the third wiring layer 33 and the third wiring layer 33 is electrically connected to the second plug electrode 23 via the lower electrode 25.

Here, in a case where a precious metal such as platinum (Pt) or iridium (Ir) is contained in the lower electrode 25 or the upper electrode 29 in the pyroelectric sensor 30, the precious metal is also contained in the lower electrode 25 in the bonding pad 40.

However, when the precious metal such as Pt or Ir is also contained in the lower electrode 25 in the bonding pad 40, there is a possibility that the adhesiveness of the bonding pad 40 and the substrate 1 side (for example, the silicon oxide film ($SiO_2$) which covers the surface of the substrate) is not sufficient and that the bonding pad 40 peels off from the substrate 1 side during wire bonding. In order to reduce such a possibility, the addition of a special process with the aim of preventing peeling of the bonding pad 40 can be considered, but there is a problem in that the manufacturing process becomes complicated due to an increase in the number of processes in this case.

2.1 Configuration

Figure 6:
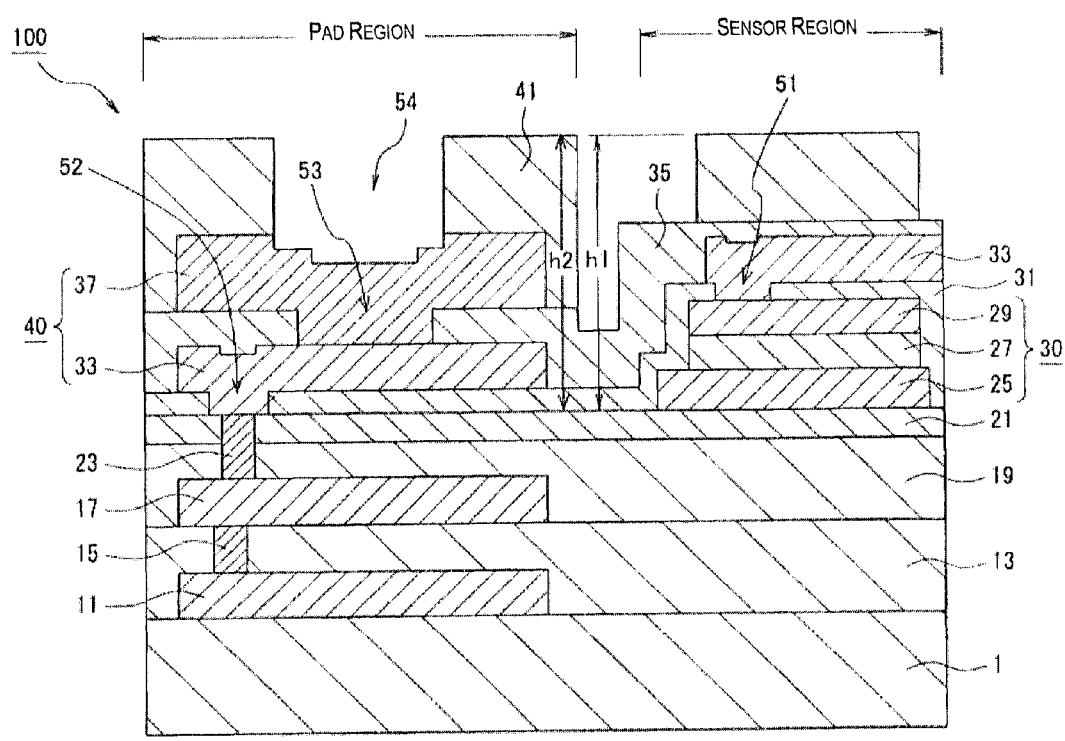
FIG. 6 is a cross sectional diagram illustrating a configuration example of an IR sensor apparatus according to a second embodiment of the invention.

FIG. 6 is a cross sectional diagram illustrating a configuration example of an IR sensor apparatus 100 according to a second embodiment of the invention which is able to solve the problem above. In the same manner as the IR sensor apparatus 100 which was described in the first embodiment, the IR sensor apparatus 100 is an apparatus which uses a pyroelectric effect and which detects light such as infrared by measuring a change in the polarization state of a pyroelectric body using a voltage or pyroelectric current.

As shown in FIG. 6, the IR sensor apparatus 100 is provided with the silicon substrate 1, the first wiring layer 11, the first interlayer insulating film 13, the second wiring layer 17, the second interlayer insulating film 19, the support layer 21, the first plug electrode 15, and the second plug electrode 23.

In addition, as shown in FIG. 6, the IR sensor apparatus 100 is provided with, for example, the pyroelectric sensor 30 which is provided in the sensor region above the silicon substrate 1, the bonding pad 40 which is provided in the pad region above the silicon substrate 1 in a position which is different to the sensor region, the first insulating film 31, the second insulating film 35, the third insulating film 41, and the third wiring layer 33.

Here, as shown in FIG. 6, the IR sensor apparatus of the second embodiment has a configuration where the lower electrode 25 does not remain in the pad region and the third wiring layer 33 remains in the pad region.

Specifically, the bonding pad 40 has the third wiring layer 33 which is formed above the support layer 21 and the pad electrode layer 37 which is formed above the third wiring layer 33.

Then, the first insulating film 31 is disposed between the support layer 21 and the third wiring layer 33 in the pad region and the second opening section 52 (refer to FIG. 7B) is provided so as to penetrate through the first insulating film 31 so that the second plug electrode 23 is the bottom surface. Then, a portion of the third wiring layer 33 in the pad region is filled into the second opening section 52. Due to this, the third wiring layer 33 in the pad region is electrically connected to the second plug electrode 23.

According to the configuration of the second embodiment in FIG. 6, since it is possible to use, for example, a material which is not a precious metal such as titanium nitride (TiN) as the constituent material of the third wiring layer 33 which is in contact with the substrate 1 side in the pad region, it is possible to maintain high adhesiveness between the bonding pad 40 and the substrate 1 side. Accordingly, compared to the configuration of the first embodiment where the lower electrode 25 remains in the pad region, it is possible to effectively suppress the peeling of the bonding pad 40 from the substrate 1 side. In addition, it is possible to reduce the height of the bonding pad 40 by the thickness of the lower electrode 25.

2.2 Manufacturing Method

Next, a method for manufacturing the IR sensor apparatus 100 will be described. FIG. 7A to FIG. 9 are cross sectional diagrams illustrating a method for manufacturing the IR sensor apparatus 100 according to the second embodiment of the invention.

The processes in FIG. 2A to FIG. 2C in the second embodiment are the same with regard to the processes until the sequential lamination of the lower electrode 25, the pyroelectric body 27, and the upper electrode 29 on the support layer 21.

After these processes, the upper electrode 29, the pyroelectric body 27, and the lower electrode 25 are patterned using a photolithography technique and an etching technique. In the patterning process, first, to begin with, the upper electrode 29 and the pyroelectric body 27 are patterned, and next, the lower electrode 25, which is exposed from below the upper electrode 29 and the pyroelectric body 27, is patterned. Although not shown, when patterning the upper electrode 29 and the pyroelectric body 27, a first resist pattern, which covers the sensor region and has a shape where the pad region is exposed (opened), is used as a mask. Due to this, the pyroelectric body 27 is exposed by removing the upper electrode 29 in the pad region and the lower electrode 25 is exposed in the pad region by removing the pyroelectric body 27 which has been exposed.

Then, in the first embodiment, when patterning the lower electrode 25, a second resist pattern, which covers both the sensor region and the pad region and has a shape where between both of the regions are exposed, is used as a mask. On the other hand, in the second embodiment, when patterning the lower electrode 25, a second resist pattern, which covers the sensor region and the pad region and has a shape where the pad region is exposed, is used as a mask.

Figure 7A:
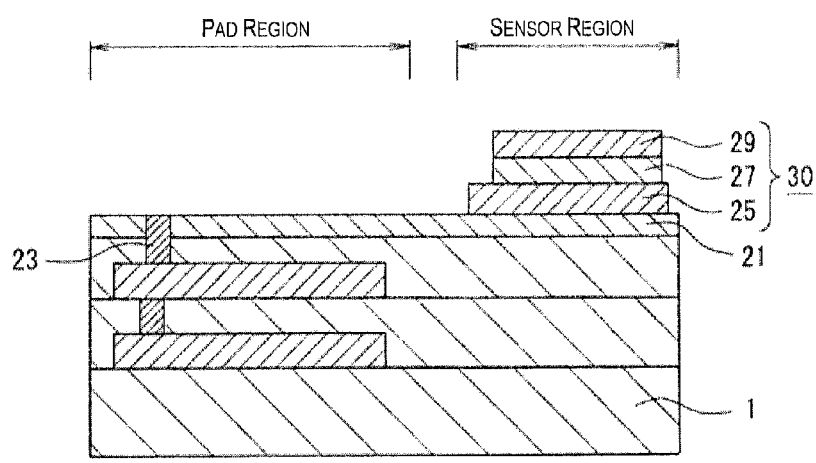
FIGS. 7A to 7C are cross sectional diagrams illustrating a method for manufacturing the IR sensor apparatus of the second embodiment.

Due to this, as shown in FIG. 7A, along with the forming of the pyroelectric sensor 30 which has the upper electrode 29, the pyroelectric body 27, and the lower electrode 25 in the sensor region, a configuration is formed where the support layer 21 is exposed by removing the lower electrode 25 which has been exposed in the pad region. In the configuration, the second plug electrode 23 is exposed from the support layer 21.

Figure 7B:
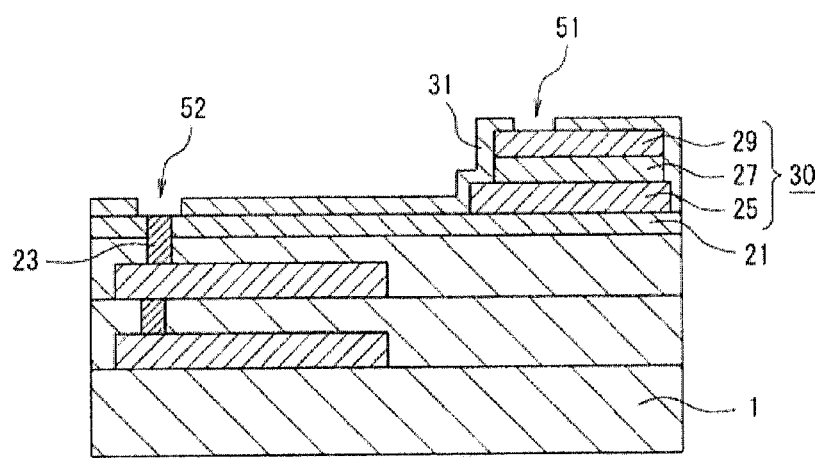

Next, as shown in FIG. 7B, the first insulating film 31 is formed above the silicon substrate 1. Then, the first insulating film 31 is patterned using a photolithography technique and an etching technique. Due to this, along with the forming of the first opening section 51 with the upper electrode 29 as the bottom surface in the first insulating film 31 in the sensor region, the second opening section 52 with the second plug electrode 23 as the bottom surface is formed in the first insulating film 31 in the pad region.

Figure 7C:
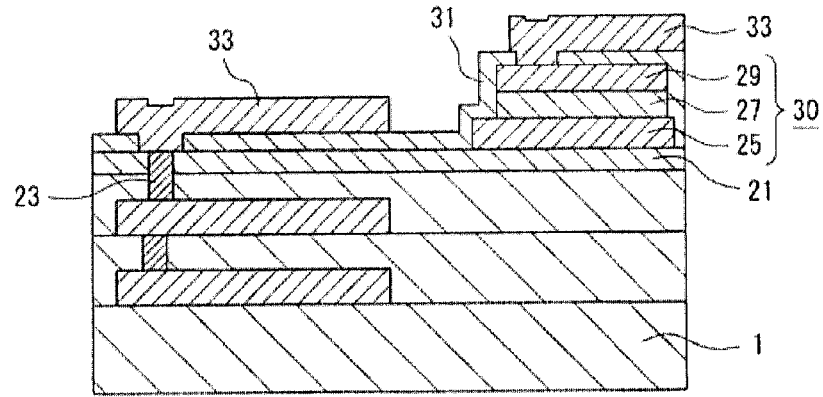

Next, for example, a conductive film such as titanium nitride is formed so as to fill in the first opening section 51 and the second opening section 52. The forming of the conductive film is performed using, for example, a sputtering method. Then, the conductive film is patterned using a photolithography technique and an etching technique. Due to this, as shown in FIG. 7C, the third wiring layer 33, which separates the sensor region and the pad region from each other, is formed.

Figure 8A:
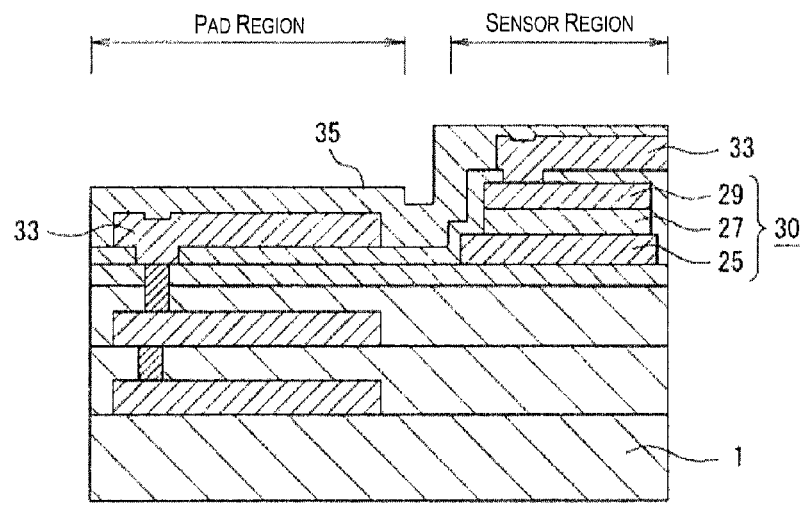
FIGS. 8A to 8C are cross sectional diagrams illustrating a method for manufacturing the IR sensor apparatus of the second embodiment.
Figure 8B:
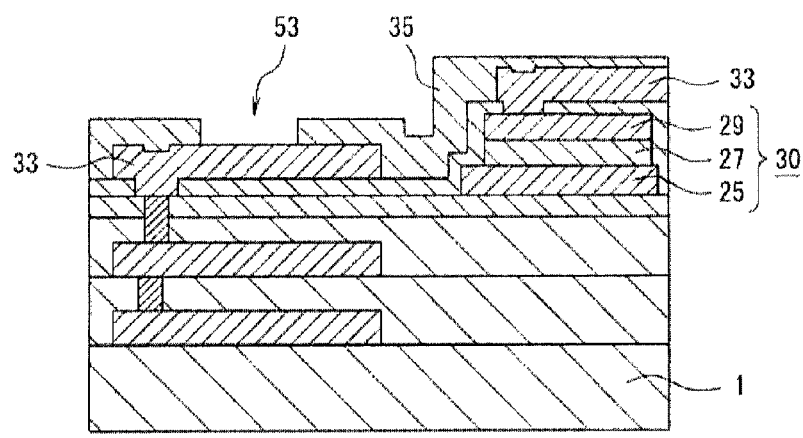
Figure 8C:
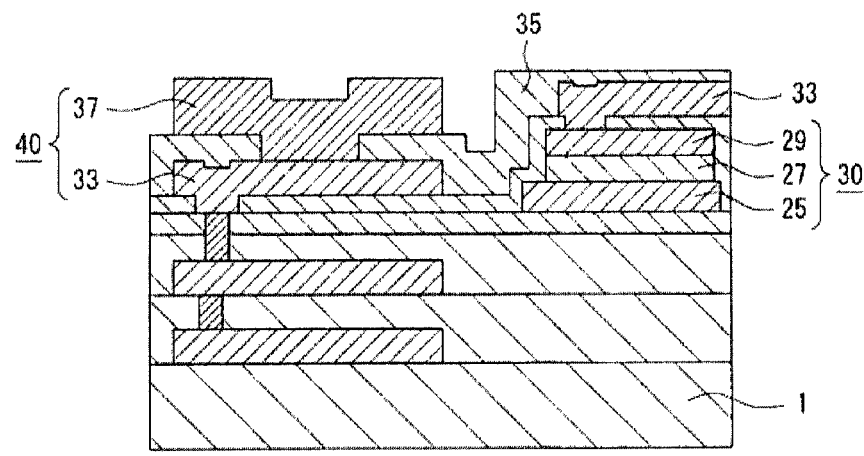
Figure 9:
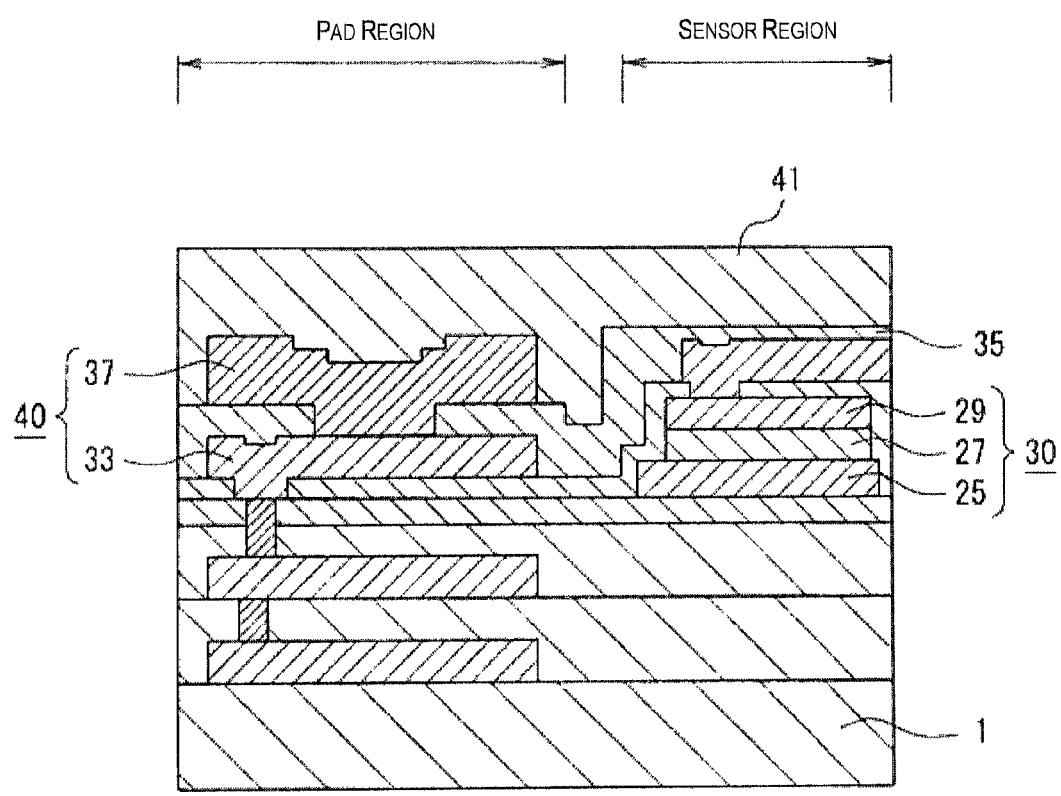
FIG. 9 is a cross sectional diagram illustrating a method for manufacturing the IR sensor apparatus of the second embodiment.

The processes beyond this are the same as the first embodiment. That is, the second insulating film 35 is formed as shown in FIG. 8A and the third opening section 53 is formed as shown in FIG. 8B. Then, the electrode layer 37 is formed as shown in FIG. 8C and the third insulating film 41 is formed as shown in FIG. 9. After this, the fourth opening section 54 is formed. Due to this, the sensor apparatus 100 which is shown in FIG. 6 is complete.

According to the second embodiment described above, the same effects as the first embodiment are achieved. In addition, for example, the effects described below are achieved in addition to the effects of the first embodiment.

That is, in the second embodiment, the pad region is formed with a configuration where the lower electrode 25 and the upper electrode 29 do not remain and the third wiring layer 33 remains. As a result, compared to a case where the lower electrode 25 remains in the pad region, it is possible to reduce the height of the bonding pad 40 by the thickness of the lower electrode 25. Due to this, it is possible that the height from the surface of the support layer 21 to the surface of the third insulating film 41 is substantially the same height in the pad region and the sensor region as shown in FIG. 6.

For example, assuming that the height from the surface of the support layer 21 to the surface of the third insulating film 41 in the sensor region is set as $h1$ and the height from the surface of the support layer 21 to the surface of the third insulating film 41 in the pad region is set as $h2$. In this case, in the first embodiment in FIG. 1, $h2 > h1$. On the other hand, according to the second embodiment in FIG. 6, since it is possible to reduce the height of the bonding pad 40 by the thickness of the lower electrode 25, it is possible that, for example, $h2 = h1$. For example, it is possible for the height $h2$ to be approximately 2.3 μm.

Furthermore, according to the second embodiment, since it is possible to use, for example, a material which is not a precious metal such as titanium nitride (TiN) as the constituent material of the third wiring layer 33, it is possible to maintain high adhesiveness between the bonding pad 40 and the substrate 1 side. Accordingly, it is possible to suppress the peeling of the bonding pad 40 from the substrate 1 side without the addition of a special process.

3. Third Embodiment in the second embodiment described above, a case is described where the second opening section 52 with the second plug electrode 23 as the bottom surface is formed in a portion of the first insulating film 31 in the pad region. However, in the invention, the region where the second opening section 52 is formed is not limited to a portion of the pad region and the second opening section 52 can be formed over the entire area (substantially the entire area) of the pad region. That is, all of the first insulating film can be removed in the pad region. In the third embodiment, such an example will be described.

3.1 Configuration

Figure 10:
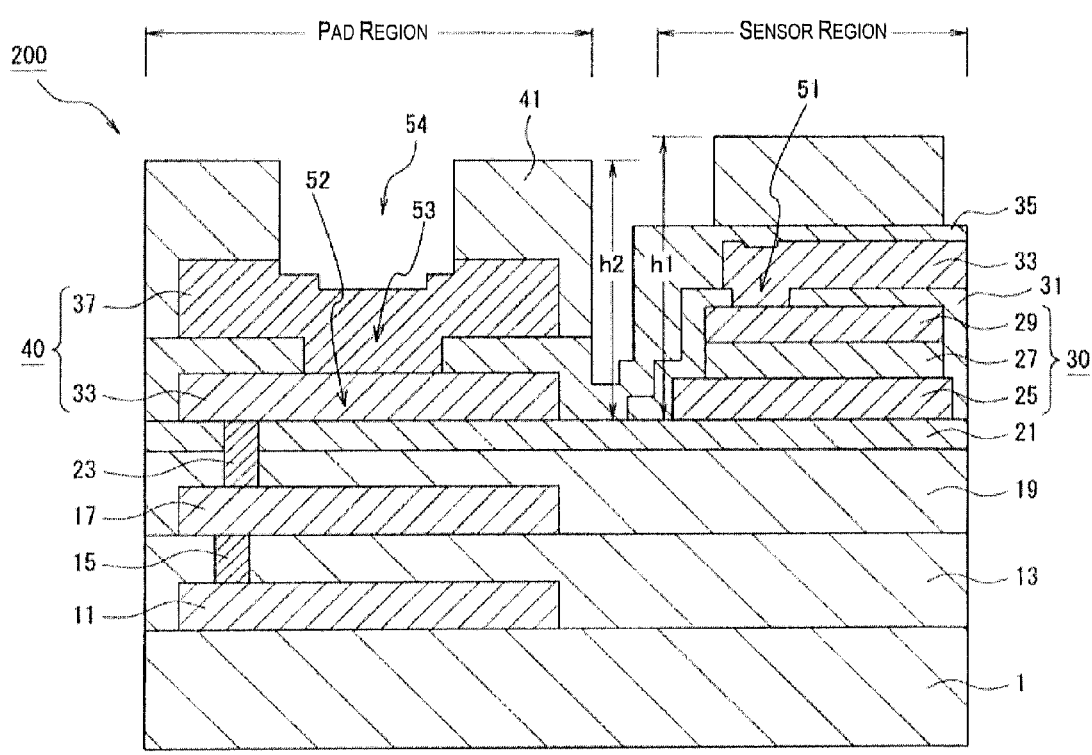
FIG. 10 is a cross sectional diagram illustrating a configuration example of an IR sensor apparatus according to a third embodiment of the invention.

FIG. 10 is a cross sectional diagram illustrating a configuration example of an IR sensor apparatus 100 according to a third embodiment of the invention. In the same manner as the IR sensor apparatus 100 which was described in the first embodiment and the second embodiment, the IR sensor apparatus 100 is an apparatus which uses a pyroelectric effect and which detects light such as infrared by measuring a change in the polarization state of a pyroelectric body using a voltage or pyroelectric current.

As shown in FIG. 10, the IR sensor apparatus 100 is provided with the silicon substrate 1, the first wiring layer 11, the first interlayer insulating film 13, the second wiring layer 17, the second interlayer insulating film 19, the support layer 21, the first plug electrode 15, and the second plug electrode 23.

In addition, as shown in FIG. 10, the IR sensor apparatus 100 is provided with, for example, the pyroelectric sensor 30 which is provided in the sensor region above the silicon substrate 1, the bonding pad 40 which is provided in the pad region above the silicon substrate 1 in a position which is different to the sensor region, the first insulating film 31, the second insulating film 35, the third insulating film 41, and the third wiring layer 33.

Figure 11A:
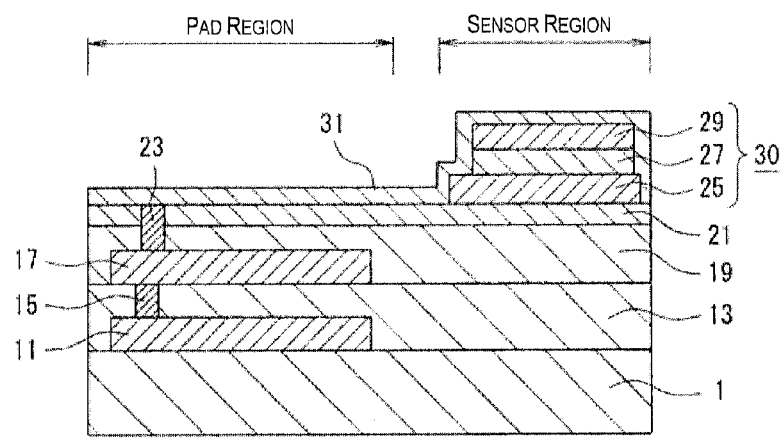
FIGS. 11A to 11C are cross sectional diagrams illustrating a method for manufacturing the IR sensor apparatus of the third embodiment.
Figure 11B:
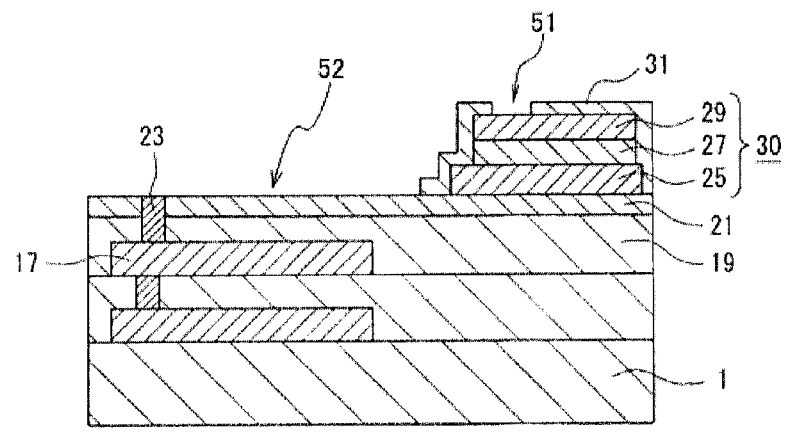

Here, as shown in FIG. 10, the first insulating film 31 is not formed in the pad region. That is, as shown in FIG. 11B which will be described later, the second opening section 52 in the first insulating film 31 is formed over the entire area of the pad region (at least the entire area below the third wiring layer 33). Then, the third wiring layer 33 in the pad region is disposed directly above the support layer 21. Due to this, in the IR sensor apparatus 100, the height h2 from the surface of the support layer 21 to the surface of the third insulating film 41 in the pad region is lower compared to the IR sensor apparatus 100 which was described in the first embodiment and the second embodiment.

3.2 Manufacturing Method

Figure 11C:
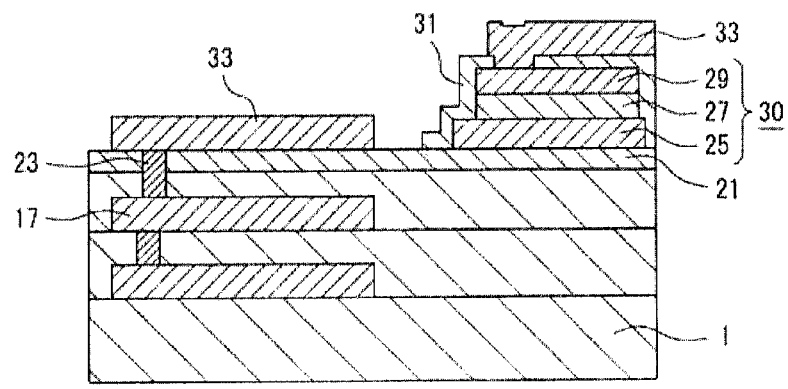

Next, a method for manufacturing the IR sensor apparatus 100 will be described. FIG. 11A to FIG. 11C are cross sectional diagrams illustrating a method for manufacturing the IR sensor apparatus 100 according to the third embodiment of the invention. In FIG. 11A, until the process where the first insulating film 31 is formed is the same as the first embodiment and the second embodiment. After the first insulating film 31 is formed, the first insulating film 31 is patterned using a photolithography technique and an etching technique. Due to this, as shown in FIG. 11B, along with the forming of the first opening section 51 with the upper electrode 29 as the bottom surface in the first insulating film 31 in the sensor region, all of the first insulating film 31 is removed from the pad region. That is, the second opening section 52 is formed in the first insulating film 31 over the entire area of the pad region.

Next, for example, a conductive film such as titanium nitride is formed to fill in the first opening section 51 and the second opening section 52. The forming of the conductive film is performed using, for example, a sputtering method. Then, the conductive film is patterned using a photolithography technique and an etching technique. Due to this, as shown in FIG. 11C, the third wiring layer 33, which separates the sensor region and the pad region from each other, is formed.

The processes beyond this are the same as the first embodiment and the second embodiment. That is, the second insulating film 35 is formed (refer to FIG. 4B) and the third opening section 53 is formed (refer to FIG. 4C). Then, the electrode layer 37 is formed (refer to FIG. 5A) and the third insulating film 41 is formed (refer to FIG. 5B). After this, the fourth opening section 54 is formed. Due to this, the sensor apparatus 100 which is shown in FIG. 10 is complete.

According to the third embodiment described above, the same effects as the first embodiment and the second embodiment are achieved. In addition, the effects described below are achieved in addition to the effects of the first embodiment and the second embodiment.

That is, according to the third embodiment of the invention, the third wiring layer 33 in the pad region is disposed directly above the support layer 21. As a result, it is possible for the height h2 from the surface of the support layer 21 to the surface of the third insulating film 41 in the pad region to be reduced by the respective thicknesses of the lower electrode 25 and the first insulating film 31 and it is possible for the height h2 to be reduced more than the second embodiment. For example, it is possible that h2<h1 and for the height h2 to be approximately 2 µm.

4. Fourth Embodiment

Here, in Japanese Unexamined Patent Application Publication No. 2011-153851 described above, the support material which supports the pyroelectric sensor above the hollow section is formed without any interruption until the outer side of the hollow section in a cross sectional view. In particular, in FIG. 7 of Japanese Unexamined Patent Application Publication No. 2011-153851, the support material is in contact with a contact section by extending until the outer side of the hollow section. As a result, there is a possibility that heat which is generated due to the reception of light is transferred from the pyroelectric body to the contact section via the support material (membrane) and there is a possibility that detection characteristics of the pyroelectric sensor are reduced due to heat being dissipated to the substrate side. In consideration of such circumstances, an IR sensor apparatus is realized in the fourth embodiment which is able to suppress dissipation of the heat which is generated due to the reception of light via the support layer.

4.1 Configuration

Figure 12:
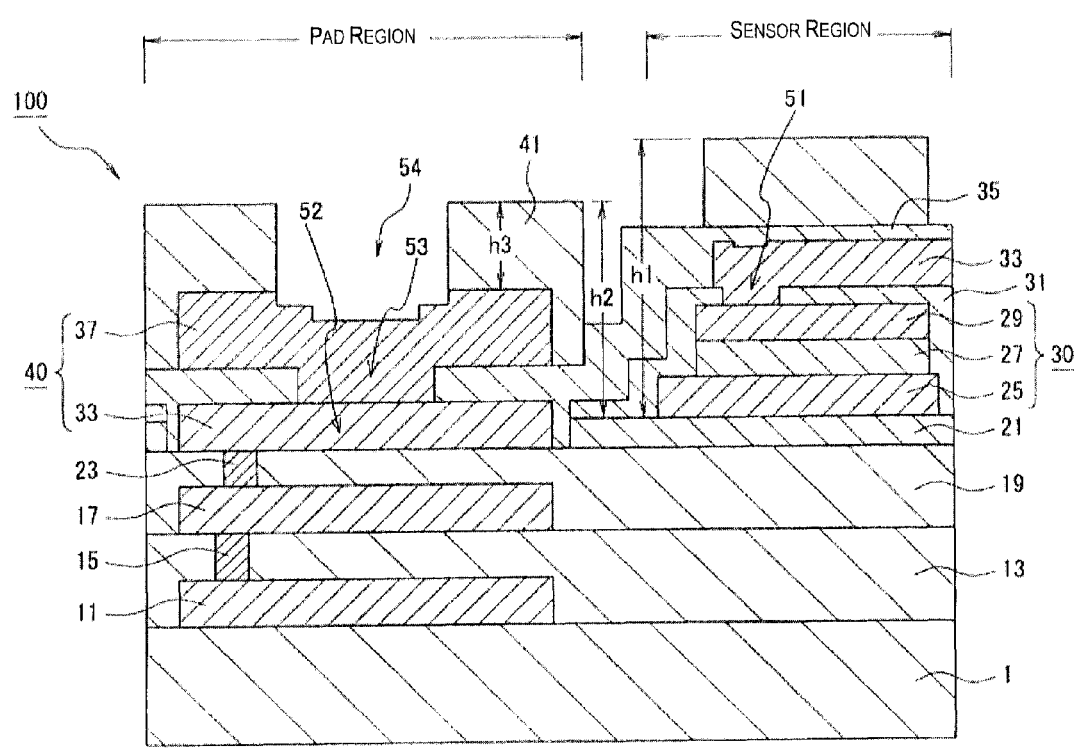
FIG. 12 is a cross sectional diagram illustrating a configuration example of an IR sensor apparatus according to a fourth embodiment of the invention.

FIG. 12 is a cross sectional diagram illustrating a configuration example of an IR sensor apparatus 100 according to a fourth embodiment of the invention. In the same manner as the IR sensor apparatus 100 which was described in the first embodiment to the third embodiment, the IR sensor apparatus 100 is an apparatus which uses a pyroelectric effect and which detects light such as infrared by measuring a change in the polarization state of a pyroelectric body using a voltage or pyroelectric current.

As shown in FIG. 12, the IR sensor apparatus 100 is provided with the silicon substrate 1, the first wiring layer 11, the first interlayer insulating film 13, the second wiring layer 17, the second interlayer insulating film 19, the support layer 21, the first plug electrode 15, and the second plug electrode 23.

In addition, as shown in FIG. 12, the IR sensor apparatus 100 is provided with, for example, the pyroelectric sensor 30 which is provided in the sensor region above the silicon substrate 1, the bonding pad 40 which is provided in the pad region above the silicon substrate 1 in a position which is different to the sensor region, the first insulating film 31, the second insulating film 35, the third insulating film 41, and the third wiring layer 33.

Here, as shown in FIG. 12, in the IR sensor apparatus of the fourth embodiment, the support layer 21 remains in the sensor region but is removed in the pad region.

Specifically, the bonding pad 40 has the third wiring layer 33 which is formed above the second interlayer insulating film 19 in the pad region and the pad electrode layer 37 which is formed above the third wiring layer 33.

In the pad region, the support layer 21 is not formed directly below the bonding pad 40. That is, in the support layer 21, the second opening section 52 (refer to FIG. 14C) is provided in the pad region to penetrate through so that the second interlayer insulating film 19 is the bottom layer. The surface of the second plug electrode 23 is included in the bottom surface of the second opening section 52. Then, the third wiring layer 33 is filled into the second opening section 52. Due to this, the third wiring layer 33 in the pad region is electrically connected to the second plug electrode 23. Here, the support layer 21 is, for example, a silicon oxide film, a silicon nitride film, or an aluminum oxide film (AlO).

According to the configuration of the fourth embodiment in FIG. 12, the third wiring layer 33 is formed directly above the second interlayer insulating film 19 without the support layer 21 remaining in the pad region. As a result, it is possible to reduce the height of the bonding pad 40 by the thickness of the support layer 21 compared to a case where the support layer 21 remains below the third wiring layer 33 in the pad region. In addition, the support layer 21 is interrupted on the way from the sensor region toward the pad region. As a result, it is possible to suppress the transfer of the heat which is generated due to the reception of light from the sensor region to the pad region via the support layer 21 and it is possible to increase the heat insulation between the sensor region and the pad region.

4.2 Manufacturing Method

Figure 13A:
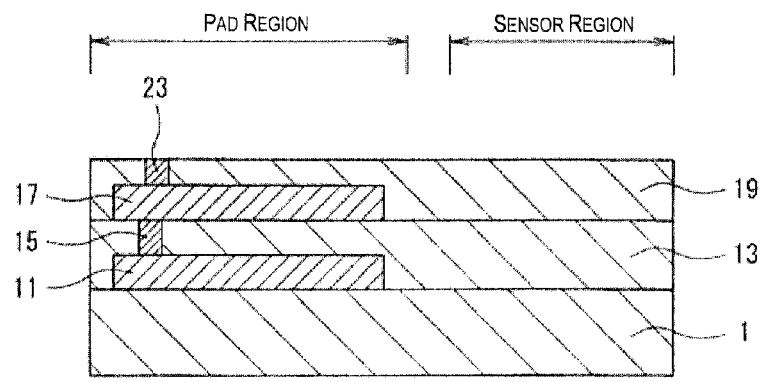
FIGS. 13A to 13C are cross sectional diagrams illustrating a method for manufacturing the IR sensor apparatus of the fourth embodiment.

Next, a method for manufacturing the IR sensor apparatus 100 will be described. FIG. 13A to FIG. 17 are cross sectional diagrams illustrating a method for manufacturing the IR sensor apparatus 100 according to the fourth embodiment of the invention. As shown in FIG. 13A, first, to begin with, the silicon substrate 1 is prepared. For example, the first wiring layer 11, the first interlayer insulating film 13, the first plug electrode 15, the second wiring layer 17, and the second interlayer insulating film 19 are formed on a surface side of the silicon substrate 1.

Next, the second interlayer insulating film 19 is partially removed using a photolithography technique and an etching technique. Due to this, an opening section is formed in the second interlayer insulating film 19 in the pad region with the second wiring layer 17 as the bottom surface. Then, the second plug electrode 23 is formed in the opening section. The method for forming the second plug electrode 23 is, for example, as below.

That is, a tungsten film is formed above the second interlayer insulating film 19 so as to fill in the opening section described above. Next, the tungsten film is removed from a region other than the inner side of the opening section (that is, above the second interlayer insulating film 19) by polishing the tungsten film and leaving the tungsten film only in the opening section. Due to this, the second plug electrode 23 is formed to be electrically connected to the second wiring layer 17 by being filled into the opening section described above.

Figure 13B:
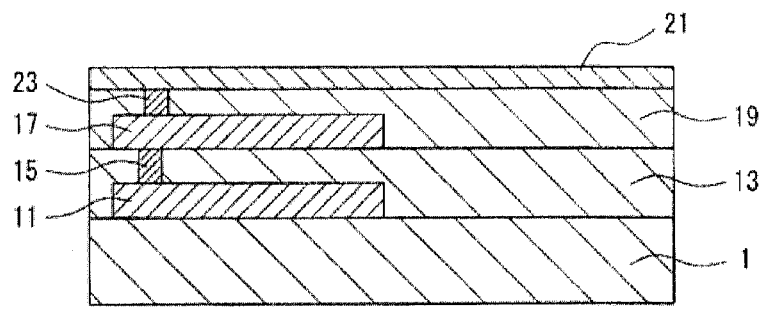
Figure 13C:
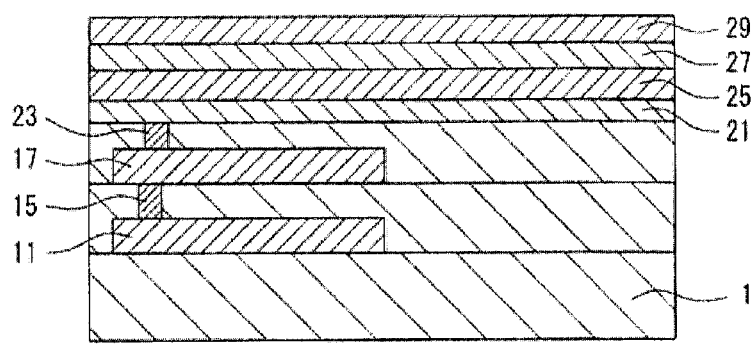

Next, as shown in FIG. 13B, the second plug electrode 23 is covered by forming the support layer 21 above the second interlayer insulating film 19. The forming of the support layer 21 is performed using, for example, a CVD (chemical vapor deposition) method. Next, as shown in FIG. 13C, the lower electrode 25, the pyroelectric body 27, and the upper electrode 29 are sequentially laminated above the support layer 21.

Next, the upper electrode 29, the pyroelectric body 27, and the lower electrode 25 are patterned using a photolithography method or an etching method. In the patterning process, first, to begin with, the upper electrode 29 and the pyroelectric body 27 are patterned, and next, the lower electrode 25, which is exposed from below the upper electrode 29 and the pyroelectric body 27, is patterned. Although not shown, when patterning the upper electrode 29 and the pyroelectric body 27, a first resist pattern, which covers the sensor region and has a shape where the pad region is exposed, is used as a mask. Due to this, the pyroelectric body 27 is exposed by removing the upper electrode 29 in the pad region and the lower electrode 25 is exposed in the pad region by removing the pyroelectric body 27 which has been exposed. In addition, when patterning the lower electrode 25, a second resist pattern, with a shape which covers the sensor region and exposes the pad region, is used as a mask.

Figure 14A:
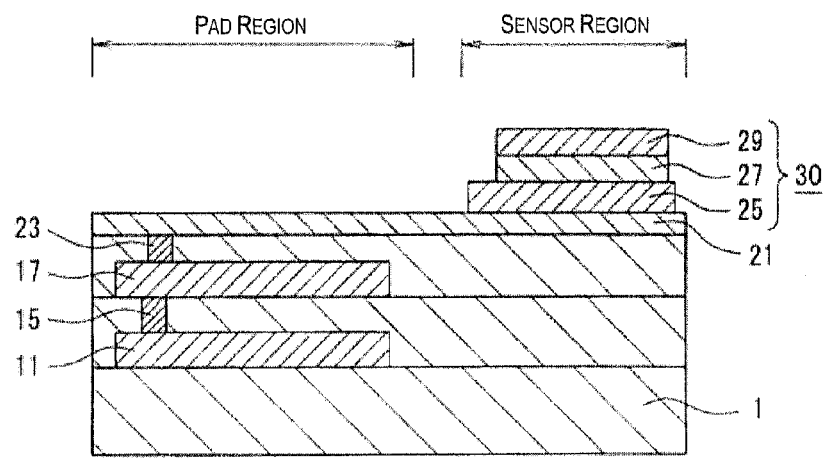
FIGS. 14A to 14C are cross sectional diagrams illustrating a method for manufacturing the IR sensor apparatus of the fourth embodiment.

Due to this, as shown in FIG. 14A, along with the forming of the pyroelectric sensor 30 which has the upper electrode 29, the pyroelectric body 27, and the lower electrode 25 in the sensor region, a configuration is formed where the support layer 21 is exposed by removing the lower electrode 25 which has been exposed in the pad region. At this point in time, the second plug electrode 23 is covered by the support layer 21 and is not exposed. That is, the support layer 21 is a cover for the second plug electrode 23.

Figure 14B:
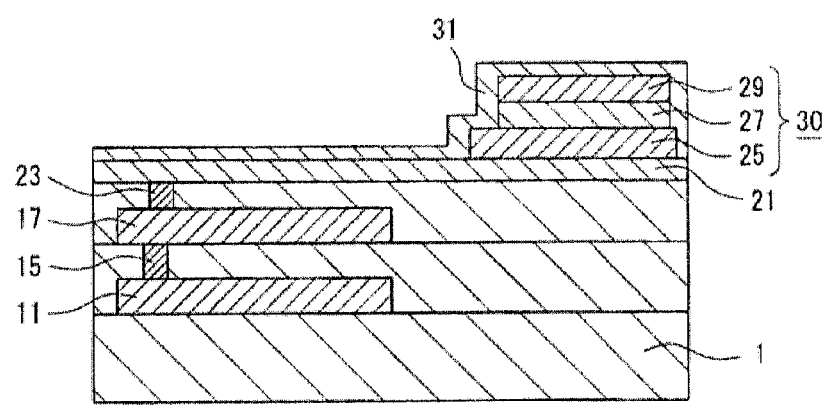
Figure 14C:
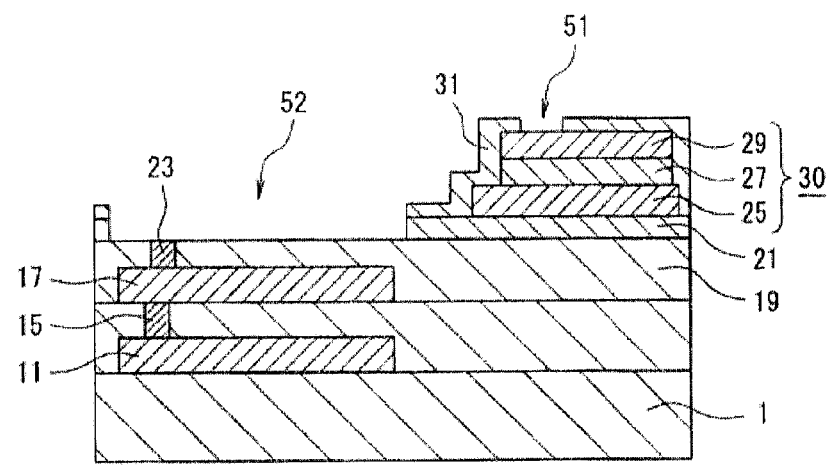

Next, as shown in FIG. 14B, the first insulating film 31 is formed above the silicon substrate 1. Then, the first insulating film 31 is patterned using a photolithography technique and an etching technique. Due to this, as shown in FIG. 14C, along with the forming of the first opening section 51 with the upper electrode 29 as the bottom surface in the first insulating film 31 in the sensor region, the second opening section 52 with the support layer 21 as the bottom surface is formed by penetrating through the first insulating film 31 in the pad region. Next, the support layer 21, which is exposed by the bottom surface of the second opening section 52, is etched and removed. Due to this, the second interlayer insulating film 19 and the second plug electrode 23 are exposed in the pad region.

Figure 15A:
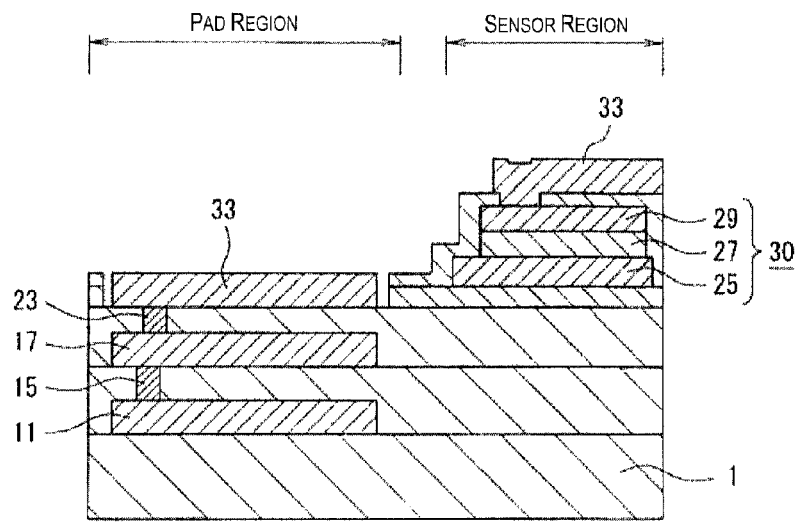
FIGS. 15A and 15B are cross sectional diagrams illustrating a method for manufacturing the IR sensor apparatus of the fourth embodiment.

Next, for example, a conductive film such as titanium nitride is formed to fill in the first opening section 51 and the second opening section 52 with the second interlayer insulating film 19 and the second plug electrode 23 as the bottom surface. Then, the conductive film is patterned using a photolithography technique and an etching technique. Due to this, as shown in FIG. 15A, the third wiring layer 33, which separates the sensor region and the pad region from each other, is formed.

Figure 15B:
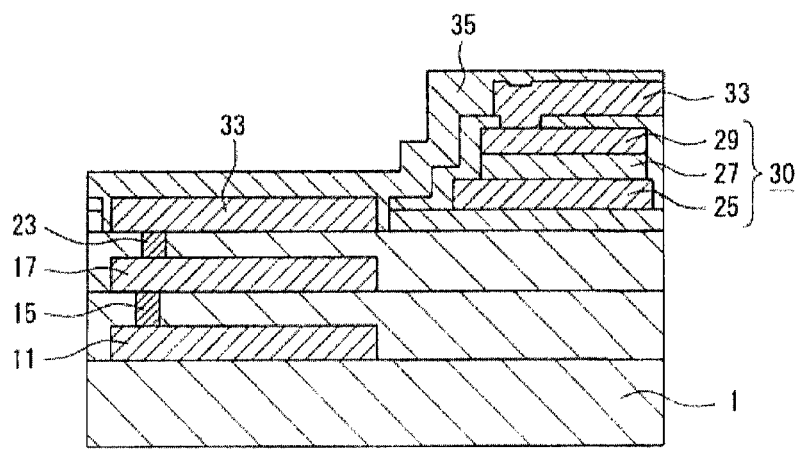
Figure 16A:
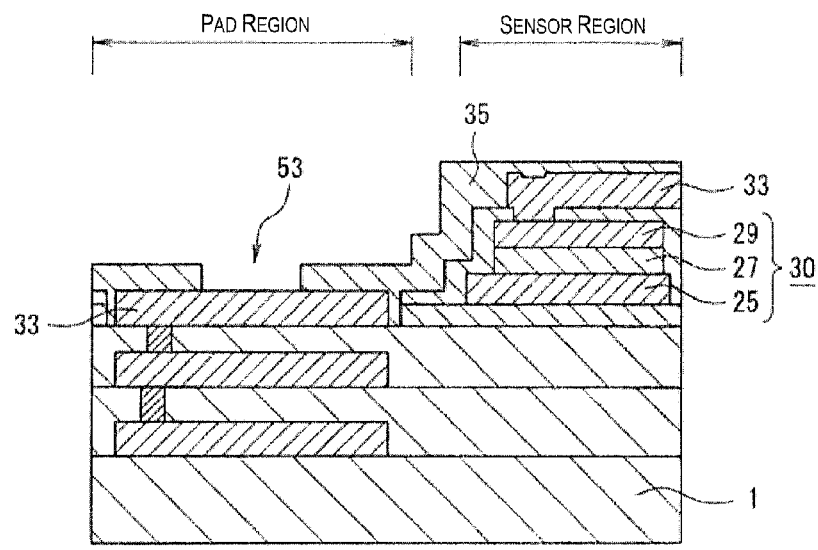
FIGS. 16A and 16B are cross sectional diagrams illustrating a method for manufacturing the IR sensor apparatus of the fourth embodiment.
Figure 16B:
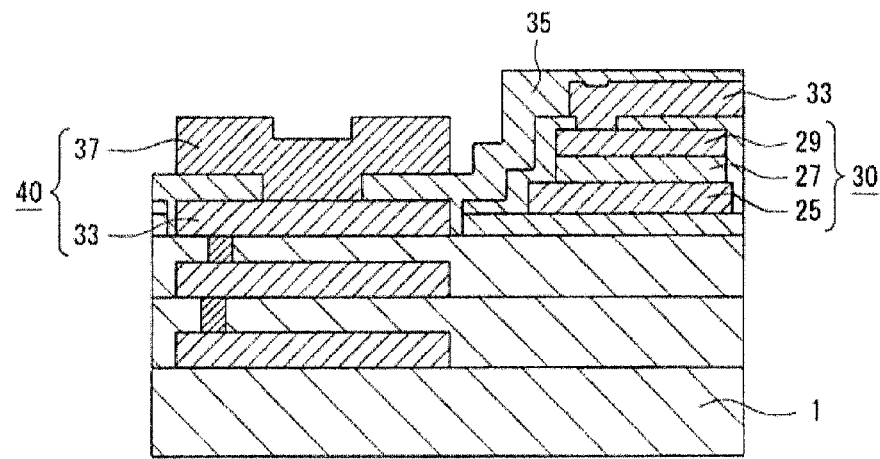

The processes beyond this are the same as the first embodiment and the second embodiment. That is, the second insulating film 35 is formed as shown in FIG. 15B and the third opening section 53 is formed as shown in FIG. 16A. Then, the electrode layer 37 is formed as shown in FIG. 16B.

Figure 17:
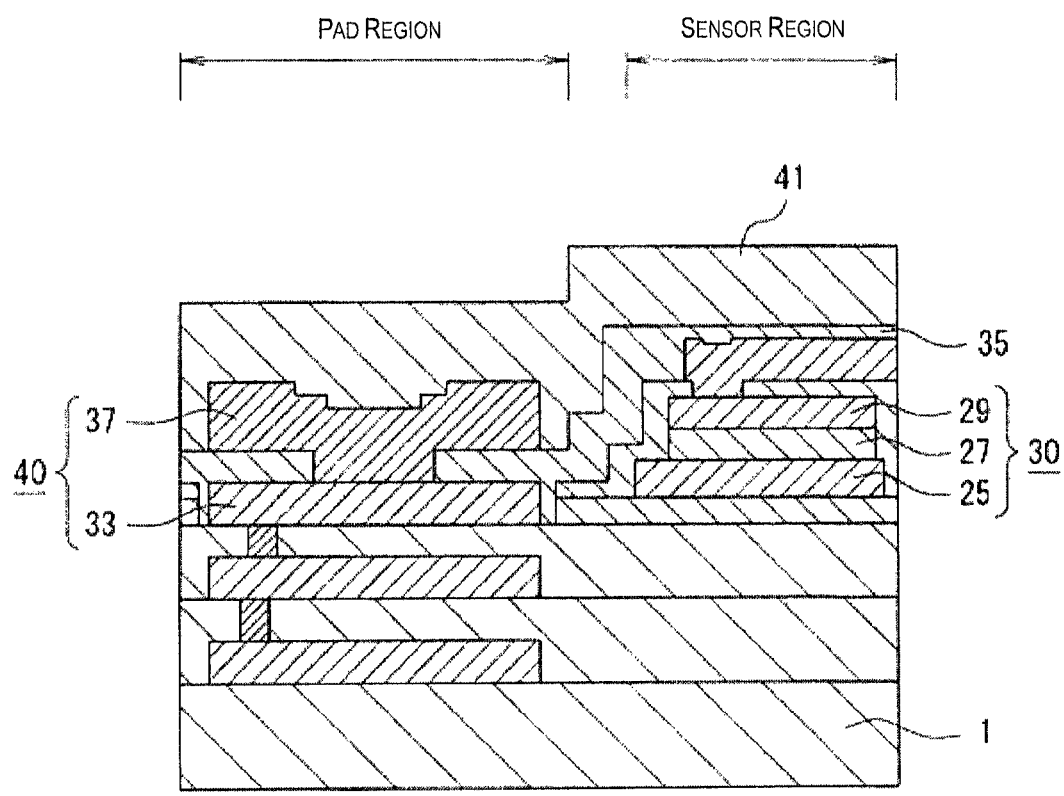
FIG. 17 is a cross sectional diagram illustrating a method for manufacturing the IR sensor apparatus of the fourth embodiment.

Next, the third insulating film 41 is formed above the silicon substrate 1 as shown in FIG. 17. Next, the third insulating film 41 is patterned using a photolithography technique and an etching technique.

Due to this, the fourth opening section 54 (refer to FIG. 12) is formed in the third insulating film 41 in the pad region with the bonding pad 40 as the bottom surface. In addition, a hollow section which is not shown is formed by etching and removing a sacrificial layer which is not shown below the support layer 21 before or after the process for the forming of the fourth opening section 54. The hollow section is a hollow section for providing heat insulation between the pyroelectric sensor 30 and the silicon substrate 1 as described above. After the forming of the hollow section, the support layer 21 remains. Then, the pyroelectric sensor 30 is supported above the hollow section by the support layer 21. Through the processes above, the IR sensor apparatus 100 which is shown in FIG. 12 is completed.

According to the fourth embodiment described above, the same effects as the first embodiment and the second embodiment are achieved. In addition, for example, the effects described below are achieved in addition to the effects of the first embodiment and the second embodiment.

That is, according to the fourth embodiment, the pad region is formed with a configuration where the support layer 21, the lower electrode 25, and the upper electrode 29 do not remain and the third wiring layer 33 is disposed directly above the second interlayer insulating film 19. That is, a configuration is formed where the support layer 21, the lower electrode 25, and the upper electrode 29 do not remain below the third wiring layer 33 in the pad region. As a result, compared to a case where the support layer 21, the lower electrode 25, and the upper electrode 29 remain below the third wiring layer 33 in the pad region, it is possible to reduce the height of the bonding pad 40 by the thickness of the support layer 21, the lower electrode 25, and the upper electrode 29.

Due to this, as shown in FIG. 12, it is possible to reduce the height of the pad region more than the height of the sensor region. For example, with the surface of the support layer 21 as a base surface, assuming that the height from the base surface to the surface of the third insulating film 41 in the sensor region is set as h1 and the height from the base surface to the surface of the third insulating film 41 in the pad region is set as h2. In this case, it is possible that h2<h1 and for the height h2 to be lower than the height h1. For example, it is possible for the height h1 to be approximately 2.3 μm and it is possible for the height h2 to be approximately 1.9 μm. Here, a thickness h3 of the third insulating film 41 in the pad region is, for example, approximately 1 μm.

In addition, according to the fourth embodiment, the support layer 21 is removed from the pad region. That is, the support layer 21 is interrupted (cut) on the way from the sensor region toward the pad region. As a result, it is possible to suppress the transfer of the heat which is generated due to the reception of light from the sensor region to the pad region via the support layer 21 and it is possible to increase the heat insulation between the sensor region and the pad region. Accordingly, since it is possible to suppress the dissipation of the heat which is generated due to the reception of light via the support layer 21, it is possible to improve the detection sensitivity of the pyroelectric sensor 30.

Furthermore, according to the method for manufacturing the IR sensor apparatus 100 which is described in the fourth embodiment, the second plug electrode 23 is covered by, for example, the support layer 21 between from the process where the support layer 21 is formed in the sensor region and the pad region (refer to FIG. 13B) and the process where the support layer 21 in the pad region is removed (refer to FIG. 14C). As a result, it is possible to prevent the oxidation of the second plug electrode 23 since all of the surface of the second plug electrode 23 is not exposed even if heat treatment is performed from among the processes of FIG. 13B to FIG. 14C (for example, an annealing process for improving the characteristics of the pyroelectric body). The effect of preventing oxidation of the second plug electrode 23 using the support layer 21 in this manner is particularly remarkable when the support layer 21 is a film with an oxidation resistance and prevention function such as a silicon nitride film or an aluminum oxide film.

Here, it is possible for the IR sensor apparatus 100 of the first embodiment to the fourth embodiment described above to be applied to, for example, a motion sensor which detects the presence of a person using the reception of infrared light, various types of devices with a temperature sensor which detects the temperature distribution of a person and the like as an example, and a manufacturing method thereof. In addition, the sensor apparatus of the invention is able to be applied also to other sensor apparatuses which use a pyroelectric body (for example, an acceleration sensor apparatus and the like) as well as the sensor apparatuses for detection of light such as infrared.

As above, the manufacturing method of the embodiment is the method for manufacturing a sensor apparatus which has a pyroelectric sensor in a first region above a substrate and has a bonding pad in a second region above the substrate which is different from the first region.

Then, the manufacturing method of the embodiment includes a process for forming a first conductive section in the first region, a process for forming a pyroelectric body above the first conductive section, a process for forming a second conductive body above the pyroelectric body, a process for forming a first insulating film both above the second conductive body and in the second region, a process for forming a first opening section with the second conductive section as the bottom surface in the first region by removing a portion of the first insulating film and for forming a second opening section in the second region, a process for filling a third conductive section into both the first opening section and the second opening section, a process of forming a second insulating film which covers the pyroelectric body in the first region and covers the third conductive section in the second region, and a process for forming a third opening section with the third conductive section as the bottom surface by removing a portion of the second insulating film.

According to the embodiment, it is possible to form the first opening section, which is for electrically connecting the second conductive section and the third conductive section in the pyroelectric sensor, and the second opening section, where the third conductive section is filled into in the bonding pad, at the same time. In addition, it is possible to form the third wiring layer, which is connected to the pyroelectric sensor, and the third wiring layer, which configures the bonding pad, at the same time. In addition, it is possible to form the second insulating film, which functions as a light absorption film by covering the pyroelectric sensor, and the second insulating film, which functions as a protective film by covering a portion of the bonding pad, at the same time.

In this manner, according to the embodiment, it is possible to form each of the bonding pad and a protective film which covers a portion of the bonding pad using each of the processes of forming the pyroelectric sensor, the third conductive section which is connected to the pyroelectric sensor, and the second insulating film which functions as a light absorption film by covering the pyroelectric sensor. Accordingly, it is possible to efficiently form the pyroelectric sensor and the bonding pad on the same substrate while suppressing an increase in the number of processes.

Here, the "substrate" is equivalent to, for example, the silicon substrate 1 described above. The "first region" and the "second region" are respectively equivalent to, for example, the sensor region and the pad region described above. In addition, the "first conductive section" and the "second conductive section" are respectively equivalent to, for example, the lower electrode 25 and the upper electrode 29 described above. In addition, the "third conductive section" is equivalent to, for example, the third wiring layer described above.

In addition, the process for forming the first conductive section in the first region, the process for forming the pyroelectric body above the first conductive section, and the process for forming the second conductive body above the pyroelectric body are equivalent to, for example, the processes which are exemplified in, for example, FIG. 2C and FIG. 13C. The process for forming the first insulating film both above the second conductive body and in the second region and the process for forming the first opening section with the second conductive section as the bottom surface in the first region by removing a portion of the first insulating film and for forming a second opening section in the second region are equivalent to, for example, the processes which are exemplified in, for example, FIG. 3B, FIG. 3C, FIG. 7B, FIG. 11B, FIG. 14B, and FIG. 14C. The process for filling the third conductive section into both the first opening section and the second opening section is equivalent to, for example, the processes which are exemplified in, for example, FIG. 4A, FIG. 7C, FIG. 11C, and FIG. 15A. The process of forming the second insulating film which covers the pyroelectric body in the first region and covers the third conductive section in the second region is equivalent to, for example, the processes which are exemplified in, for example, FIG. 4B, FIG. 8A, and FIG. 15B. The process for forming the third opening section with the third conductive section as the bottom surface by removing a portion of the second insulating film is equivalent to, for example, the processes which are exemplified in, for example, FIG. 4C, FIG. 8B, and FIG. 16A.

In addition, in the embodiment, a process for forming a fourth conductive section above the second insulating film in the second region so as to fill in the third opening section, a process for forming a third insulating film both above the fourth conductive section and above the second insulating film in the first region, and a process for forming a fourth opening section with the fourth conductive section as the bottom surface by removing a portion of the third insulating film can be further included.

By doing this, it is possible to bond an end of a conductive wire to the bonding pad with high adhesiveness. Since, for example, the third conductive section is titanium nitride (TiN) and titanium nitride and gold (Au) are not in direct contact even in a case where the conductive wire is a gold wire, it is possible to increase the adhesiveness of the bonding pad and the conductive wire.

Here, the "fourth conductive section" is equivalent to, for example, the electrode layer 37 described above. In addition, the process for forming the fourth conductive section above the second insulating film in the second region so as to fill in the third opening section, the process for forming the third insulating film both above the fourth conductive section and above the second insulating film in the first region, and the process for forming the fourth opening section with the fourth conductive section as the bottom surface by removing a portion of the third insulating film are equivalent to, for example, the processes which are exemplified in, for example, FIG. 5A, FIG. 5B, FIG. 1, FIG. 8C, FIG. 9, FIG. 6, FIG. 16B, FIG. 17, and FIG. 12.

In addition, in the embodiment, the process for forming the pyroelectric body and the process for forming the second conductive section can be a process where the pyroelectric body and the second conductive section are laminated above the first conductive section, the pyroelectric body is exposed by removing the second conductive section in the second region, and the first conductive section in the second region is exposed by removing the pyroelectric body which has been exposed.

By doing this, it is possible to form a configuration where the first conductive section is laminated with the pyroelectric body and the second conductive section in the first region and where the first conductive section exists in the second region and the pyroelectric body and the second conductive section do not exist in the second region. That is, it is possible to form a configuration where only the first conductive section out of the first conductive section, the pyroelectric body, and the second conductive section remains in the second region.

Here, the process where the pyroelectric body and the second conductive section are laminated above the first conductive section, the pyroelectric body is exposed by removing the second conductive section in the second region, and the first conductive section in the second region is exposed by removing the pyroelectric body which has been exposed is equivalent to, for example, the processes which are exemplified in, for example, FIG. 2C and FIG. 3A.

In addition, in the embodiment, the process for forming the first conductive section, the process for forming the pyroelectric body, and the process for forming the second conductive section can be a process where the first conductive section is formed in each of the first region and the second region, the pyroelectric body and the second conductive section are laminated above the first conductive section, the pyroelectric body is exposed by removing the second conductive section in the second region, the first conductive section in the second region is exposed by removing the pyroelectric body which has been exposed, and the first conductive section which has been exposed is removed.

By doing this, it is possible to form a configuration where the first conductive section is laminated with the pyroelectric body and the second conductive section in the first region and where the first conductive section, the pyroelectric body, and the second conductive section do not exist in the second region. That is, a configuration is formed where the first conductive section and the second conductive section do not remain in the second region and the third conductive section remains. As a result, it is possible to reduce the height of the bonding pad compared to a case where, for example, the first conductive section remains in the second region. Furthermore, it is possible to use, for example, a material which is not a precious metal such as titanium nitride (TiN) as the constituent material of the third conductive section. As a result, it is possible to maintain high adhesiveness between the bonding pad and the substrate side. It is possible to suppress the peeling of the bonding pad from the substrate side without the addition of a special process.

Here, the process where the first conductive section is formed in each of the first region and the second region, the pyroelectric body and the second conductive section are laminated above the first conductive section, the pyroelectric body is exposed by removing the second conductive section in the second region, the first conductive section in the second region is exposed by removing the pyroelectric body which has been exposed, and the first conductive section which has been exposed is removed is equivalent to, for example, the processes which are exemplified in, for example, FIG. 2C and FIG. 7A.

In addition, in the embodiment, the process for forming the second opening section can be a process where the second opening section is formed by removing a portion of the first insulating film in the second region.

By doing this, it is possible to electrically connect the third conductive section and a plug electrode via the second opening section by forming the third conductive section so as to fill in the second opening section.

Here, the process where the second opening section is formed by removing a portion of the first insulating film in the second region is equivalent to, for example, the process which is exemplified in, for example, FIG. 7B.

In addition, in the embodiment, the process for forming the second opening section can be a process where the second opening section is formed over the entire area below the third conductive section in the second region by removing the first insulating film in the second region.

By doing this, the second opening section in the first insulating film is formed at least over the entire area below the third conductive section in the second region. Then, the third conductive section in the second region is disposed directly above the support body and the like. Due to this, it is possible to further reduce the height from the surface of the support body and the like in the second region to the surface of the third insulating film.

Here, the process where the second opening section is formed over the entire area below the third conductive section in the second region by removing the first insulating film in the second region is equivalent to, for example, the process which is exemplified in, for example, FIG. 11B.

In addition, in the embodiment, a process for forming a support body for supporting the pyroelectric sensor in the first region can be further included and the process for forming the first conductive section can be a process where the first conductive section is formed above the support body.

By doing this, it is possible to form the support body for supporting the pyroelectric sensor and form the first conductive section, the pyroelectric body, and the second conductive section which configure the pyroelectric sensor above the support body.

In addition, in the embodiment, the process for forming the support body can be a process where the support body is formed in each of the first region and the second region and the support body, which is exposed at the bottom surface of the second opening section, is removed before the third conductive section is filled into the second opening section.

By doing this, a configuration is formed where the support body does not remain below the third conductive section in the second region. As a result, it is possible to reduce the height of the bonding pad compared to a case where the support body remains below the third conductive section in the second region. Furthermore, the support body is removed from the second region. That is, the support body is interrupted on the way from the first region to the second region. As a result, it is possible to suppress the transfer of the heat which is generated due to the reception of light from the first region to the second region via the support body and it is possible to increase the heat insulation between the first region and the second region. Since it is possible to suppress the dissipation of the heat which is generated due to the reception of light via the support body, it is possible to improve the detection sensitivity of the pyroelectric sensor.

Here, the "support body" is, for example, equivalent to the support layer 21 described above. In addition, the process where the support body is formed in each of the first region and the second region and the support body, which is exposed at the bottom surface of the second opening section, is removed before the third conductive section is filled into the second opening section is equivalent to, for example, the process which is exemplified in, for example, FIG. 14C.

In addition, the sensor apparatus of the embodiment is a sensor apparatus which has a pyroelectric sensor in a first region above a substrate and has a bonding pad in a second region above the substrate which is different from the first region. Then, the sensor apparatus of the embodiment has a first conductive section which is formed in the first region, a pyroelectric body which is formed above the first conductive section, a second conductive section which is formed above the pyroelectric body, a first insulating section which is formed above the substrate so as to cover the second conductive section, has a first opening section with the second conductive section as the bottom surface, and has a second opening in the second region, a third conductive section which is filled into both the first opening section and the second opening section, and a second insulating film which covers the pyroelectric body in the first region, covers the third conductive section in the second region, and has a third opening section with the third conductive section in the second region as the bottom surface.

The sensor apparatus of the embodiment with such a configuration is equivalent to, for example, the sensor apparatuses with the configurations which are exemplified in FIG. 1, FIG. 6, FIG. 10, and FIG. 12. Then, according to the embodiment, it is possible to provide a sensor apparatus where it is possible to efficiently form the pyroelectric sensor and the bonding pad on the same substrate while suppressing an increase in the number of processes.

In addition, in the embodiment, a fourth conductive section which is formed above the second insulating film in the second region so as to fill in the third opening section and a third insulating film which is formed both above the second insulating film in the first region and above the fourth conductive section in the second region and which has a fourth opening section with the fourth conductive section in the second region as the bottom surface can be further included.

The sensor apparatus of the embodiment with such a configuration is equivalent to, for example, the sensor apparatuses with the configurations which are exemplified in FIG. 1, FIG. 6, FIG. 10, and FIG. 12 described above. Then, according to the embodiment, it is possible to bond an end of a conductive wire to the bonding pad with high adhesiveness.

In addition, in the embodiment, the first conductive section can be a conductive section which is formed in the first region and is formed below the third conductive section in the second region and the second opening section is an opening section with the first conductive section in the second region as the bottom surface.

The sensor apparatus of the embodiment with such a configuration is equivalent to, for example, the sensor apparatus with the configuration which is exemplified in FIG. 1 described above. Then, according to the embodiment, it is possible to realize a sensor apparatus with a configuration where only the first conductive section out of the first conductive section, the pyroelectric section, and the second conductive section remains in the second region.

In addition, in the embodiment, the first conductive section can be disposed in the first region and not disposed in the second region and the second opening section can be an opening section with a plug electrode below the third conductive section in the second region as the bottom surface.

The sensor apparatus of the embodiment with such a configuration is equivalent to, for example, the sensor apparatuses with the configurations which are exemplified in FIG. 6 and FIG. 10 described above. In addition, the "plug electrode" is equivalent to, for example, the second plug electrode 23 described above. Then, according to the embodiment, it is possible to provide a sensor apparatus with a configuration where the first conductive section does not remain in the second region. Accordingly, it is possible to reduce the height of the bonding pad compared to a case where the first conductive section remains in the second region. Furthermore, the third conductive section is electrically connected in the plug electrode via the second opening section. Accordingly, it is possible to use, for example, a material which is not a precious metal as the constituent material of the third conductive section and it is possible to maintain high adhesiveness between the bonding pad and the substrate side.

In addition, in the embodiment, the second opening section can be an opening section which is formed over the entire area below the third conductive section in the second region.

The sensor apparatus of the embodiment with such a configuration is equivalent to, for example, the sensor apparatus with the configuration which is exemplified in FIG. 10 described above. Then, according to the embodiment, the third conductive section in the second region is disposed directly above the support body and the like since the second opening section is formed over the over area below the third conductive section in the second region. Due to this, it is possible to further reduce the height of the bonding pad.

In addition, in the embodiment, the support body for supporting the pyroelectric sensor can be included and the first conductive section can be a conductive section which is formed above the support body.

By doing this, it is possible to provide a sensor apparatus where the first conductive section, the pyroelectric body, and the second conductive section which configure the pyroelectric sensor are formed above the support body.

In addition, in the embodiment, the support body can be disposed in the first region and not disposed in the second region.

By doing this, it is possible to reduce the height of the bonding pad compared to a case where the support body remains below the third conductive section in the second region. In addition, it is possible to suppress the transfer of the heat which is generated due to the reception of light from the first region to the second region via the support body and it is possible to increase the heat insulation between the first region and the second region.

In addition, in the embodiment, it can be the case that h2≤h1 in a case where, with the surface of the support body as a base surface, the height from the base surface to the surface of the third insulating film in the first region is set as h1 and the height from the base surface to the surface of the third insulating film in the second region is set as h2.

The sensor apparatus of the embodiment with such a configuration is equivalent to, for example, the sensor apparatuses with the configurations which are exemplified in FIG. 6, FIG. 10, and FIG. 12 described above. For example, h2=h1 in FIG. 6 and h2<h1 in FIG. 10 and FIG. 12, and it is possible to further reduce the height of the bonding pad compared to FIG. 1.

As described above, the embodiments of the invention have been described in detail but the possibility of various modifications which do not depart in practice from the novel items and effects of the invention is to be easily comprehended by those skilled in the art. Accordingly, all of such modified examples are included in the scope of the invention.

The entire disclosure of Japanese Patent Application No. 2011-263439, filed Dec. 1, 2011. No. 2011-263440. filed Dec. 1, 2011. No. 2011-263442, filed Dec. 1, 2011 are expressly incorporated reference herein.

What is claimed is:

1. A method for manufacturing a sensor apparatus, which has a pyroelectric sensor in a first region above a substrate and has a bonding pad in a second region which is different to the first region above the substrate, the method comprising:
   forming a first conductive section in the first region;
   forming a pyroelectric body above the first conductive section;
   forming a second conductive section above the pyroelectric body;
   forming a first insulating film both above the second conductive section and in the second region;
   forming a first opening section with the second conductive section as the bottom surface in the first region by removing a portion of the first insulating film and for forming a second opening section in the second region;
   filling a third conductive section into both the first opening section and the second opening section;
   forming a second insulating film which covers the pyroelectric body in the first region and covers the third conductive section in the second region; and
   forming a third opening section with the third conductive section as the bottom surface by removing a portion of the second insulating film.

2. The method for manufacturing a sensor apparatus according to claim 1, further comprising:
   forming a fourth conductive section above the second insulating film in the second region so as to fill in the third opening section;
   forming a third insulating film both above the fourth conductive section and above the second insulating film in the first region; and
   forming a fourth opening section with the fourth conductive section as the bottom surface by removing a portion of the third insulating film.

3. The method for manufacturing a sensor apparatus according to claim 1,
   wherein the forming of the pyroelectric body and the forming of the second conductive section is laminating the pyroelectric body and the second conductive section above the first conductive section, exposing the pyroelectric body by removing the second conductive section in the second region, and exposing the first conductive section in the second region by removing the pyroelectric body which has been exposed.

4. The method for manufacturing a sensor apparatus according to claim 1,
   wherein the forming of the first conductive section, the forming of the pyroelectric body, and the forming of the second conductive section is forming the first conductive section in each of the first region and the second region, laminating the pyroelectric body and the second conductive section above the first conductive section, exposing the pyroelectric body by removing the second conductive section in the second region, exposing the first conductive section in the second region by removing the pyroelectric body which has been exposed, and removing the first conductive section which has been exposed.

5. The method for manufacturing a sensor apparatus according to claim 4,
   wherein the forming of the second opening section is forming the second opening section by removing a portion of the first insulating film in the second region.

6. The method for manufacturing a sensor apparatus according to claim 4,
   wherein the forming of the second opening section is forming the second opening section over the entire area below the third conductive section in the second region by removing the first insulating film in the second region.

7. The method for manufacturing a sensor apparatus according to claim 1, further comprising,
   forming a support body for supporting the pyroelectric sensor in the first region,
   wherein the forming of the first conductive section is forming the first conductive section above the support body.

8. The method for manufacturing a sensor apparatus according to claim 7,
   wherein the forming of the support body is forming the support body in each of the first region and the second region and removing the support body, which is exposed at the bottom surface of the second opening section, before the third conductive section is filled into the second opening section.

9. A sensor apparatus, which has a pyroelectric sensor in a first region above a substrate and has a bonding pad in a second region which is different to the first region above the substrate, comprising:
- a first conductive section which is formed in the first region;
- a pyroelectric body which is formed above the first conductive section;
- a second conductive section which is formed above the pyroelectric body;
- a first insulating film which is formed above the substrate so as to cover the second conductive section, has a first opening section with the second conductive section as the bottom surface, and has a second opening section in the second region;
- a third conductive section which is filled into both the first opening section and the second opening section; and
- a second insulating film which covers the pyroelectric body in the first region, covers the third conductive section in the second region, and has a third opening section with the third conductive section in the second region as the bottom surface.

10. The sensor apparatus according to claim 9, further comprising:
- a fourth conductive section which is formed above the second insulating film in the second region so as to fill in the third opening section; and
- a third insulating film which is formed both above the second insulating film in the first region and above the fourth conductive section in the second region and which has a fourth opening section with the fourth conductive section in the second region as the bottom surface.

11. The sensor apparatus according to claim 9,
wherein the first conductive section is a conductive section which is formed in the first region and is formed below the third conductive section in the second region, and
the second opening section is an opening section with the first conductive section in the second region as the bottom surface.

12. The sensor apparatus according to claim 9,
wherein the first conductive section is disposed in the first region and not disposed in the second region, and
the second opening section is an opening section with a plug electrode below the third conductive section in the second region as the bottom surface.

13. The sensor apparatus according to claim 12,
wherein the second opening section is an opening section which is formed over the entire area below the third conductive section in the second region.

14. The sensor apparatus according to claim 9,
wherein the support body for supporting the pyroelectric sensor is included, and
the first conductive section is a conductive section which is formed above the support body.

15. The sensor apparatus according to claim 14,
wherein the support body is disposed in the first region and not disposed in the second region.

16. The sensor apparatus according to claim 14,
wherein $h2 \leq h1$ in a case where, with the surface of the support body as a base surface, the height from the base surface to the surface of the third insulating film in the first region is set as $h1$ and the height from the base surface to the surface of the third insulating film in the second region is set as $h2$.

* * * * *